(12) United States Patent
Rauenbuehler et al.

(10) Patent No.: US 10,887,400 B2
(45) Date of Patent: Jan. 5, 2021

(54) ANSWERING A CALL WITH CLIENT THROUGH A HOST

(71) Applicant: Apple Inc., Cupertino, CA (US)

(72) Inventors: Keith W. Rauenbuehler, San Francisco, CA (US); Jason Adam Bernardo, Mountain View, CA (US); Nicholas M. Fraioli, Mountain View, CA (US); Gurtej Singh Chandok, Mountain View, CA (US); Christopher M. Garrido, San Jose, CA (US); Thomas Jansen, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/628,475

(22) Filed: Jun. 20, 2017

(65) Prior Publication Data

US 2017/0289266 A1 Oct. 5, 2017

Related U.S. Application Data

(63) Continuation of application No. 14/475,390, filed on Sep. 2, 2014, now Pat. No. 9,712,623.
(Continued)

(51) Int. Cl.
*G06F 15/16* (2006.01)
*H04L 29/08* (2006.01)
(Continued)

(52) U.S. Cl.
CPC ............ *H04L 67/141* (2013.01); *H04L 67/10* (2013.01); *H04M 1/006* (2013.01); *H04M 1/7253* (2013.01); *H04M 1/72519* (2013.01)

(58) Field of Classification Search
CPC ............. H04M 1/006; H04M 1/72519; H04M 1/7253; H04L 67/10; H04L 67/141
See application file for complete search history.

(56) References Cited

U.S. PATENT DOCUMENTS 6,449,496 B1 9/2002 Beith et al.
7,130,664 B1 10/2006 Williams
(Continued)

FOREIGN PATENT DOCUMENTS

CN 101945361 A 1/2011
CN 102158616 A 8/2011
(Continued)

OTHER PUBLICATIONS

International Search Report and Written Opinion of the International Searching Authority dated Sep. 2, 2015 for PCT Application No. PCT/US2015/032468, 10 pages.
(Continued)

*Primary Examiner* — Padma Mundur
(74) *Attorney, Agent, or Firm* — Kilpatrick, Townsend & Stockton

(57) ABSTRACT

A client device may be used to initiate or answer calls using a host device connected to a network. For example, when a phone operating as a host device receives an incoming call from a network, the phone may communicate the presence of the incoming call to one or more client devices such as laptop, desktop, tablet, or wearable devices that are associated with the host device. When an answer call selection is made at a client, a call answered communication may be sent from the client device to the host device. The host device may then communicate with the network to connect the call to the host, and when the call is connected, the host may hand-off the call to the client that sent the call answered communication.

20 Claims, 11 Drawing Sheets

Related U.S. Application Data

(60) Provisional application No. 62/005,534, filed on May 30, 2014.

(51) Int. Cl.
*H04M 1/00* (2006.01)
*H04M 1/725* (2006.01)

(56) References Cited

U.S. PATENT DOCUMENTS

| | | | |
|---|---|---|---|
| 7,734,022 | B1 | 6/2010 | Croak et al. |
| 8,787,006 | B2 | 7/2014 | Golko et al. |
| 9,049,696 | B2 | 6/2015 | Sansalone |
| 9,721,412 | B2 | 8/2017 | Kankkunen et al. |
| 2002/0115478 | A1 | 8/2002 | Fujisawa et al. |
| 2002/0142734 | A1* | 10/2002 | Wickstead ............ H04B 1/385 455/553.1 |
| 2003/0224840 | A1 | 12/2003 | Frank et al. |
| 2005/0070261 | A1 | 3/2005 | Belmont et al. |
| 2008/0113689 | A1* | 5/2008 | Bailey ................. H04M 1/271 455/569.1 |
| 2008/0130554 | A1* | 6/2008 | Gisby ................ H04M 3/4234 370/328 |
| 2009/0124281 | A1* | 5/2009 | Takamune .......... H04M 1/6066 455/550.1 |
| 2009/0156167 | A1 | 6/2009 | Mooney |
| 2009/0233589 | A1 | 9/2009 | Zohar |
| 2012/0304245 | A1 | 11/2012 | Lawson et al. |
| 2013/0078966 | A1* | 3/2013 | Chang .................... H04W 4/16 455/414.1 |
| 2014/0045547 | A1* | 2/2014 | Singamsetty ......... G06F 1/1643 455/552.1 |
| 2014/0068710 | A1 | 3/2014 | Lau et al. |
| 2014/0128030 | A1 | 5/2014 | Milstein |
| 2014/0128063 | A1 | 5/2014 | Chhabra |
| 2015/0147975 | A1* | 5/2015 | Li ....................... H04M 1/7253 455/41.3 |
| 2015/0186092 | A1* | 7/2015 | Francis ................. G06F 3/1423 345/520 |
| 2015/0350418 | A1 | 12/2015 | Rauenbuehler et al. |

FOREIGN PATENT DOCUMENTS

| | | |
|---|---|---|
| EP | 1 235 387 A1 | 8/2002 |
| EP | 1 628 460 A1 | 2/2006 |
| JP | 2009164780 A2 | 7/2009 |
| JP | 2009164783 A2 | 7/2009 |
| JP | 2010268330 A2 | 11/2010 |
| KR | 20090086621 A | 8/2009 |
| KR | 102013006496 A | 9/2010 |
| KR | 20130020785 A | 2/2013 |
| WO | 2015/183825 A1 | 12/2015 |

OTHER PUBLICATIONS

International Search Report and Written Opinion of the International Searching Authority dated Sep. 2, 2015 for PCT Application No. PCT/US2015/032465, 12 pages.
Notice of Allowance and Fee(s) Due dated Nov. 3, 2016 in U.S. Appl. No. 14/475,458. 8 pages.
Notice of Allowance and Fee(s) Due dated Jan. 17, 2017 in U.S. Appl. No. 14/475,458. 2 pages.
Final Office Action dated Jun. 22, 2016 in U.S. Appl. No. 14/475,458. 15 pages.
Non-Final Office Action dated Dec. 24, 2015 in U.S. Appl. No. 14/475,458. 14 pages.
Final Office Action dated Dec. 16, 2016 in U.S. Appl. No. 14/475,390. 24 pages.
Non-Final Office Action dated May 6, 2016 in U.S. Appl. No. 14/475,390. 19 pages.
Office Action dated Feb. 27, 2018 in Korean Patent Application No. 10-2016-7032854. 13 pages. (includes English translation).
Notification of First Office Action dated Dec. 13, 2018 in Chinese Patent Application No. 201580028712.7. 22 pages includes English translation.
Office Action dated Jan. 25, 2019 in European Patent Application No. 15 730 889.1-1216. 4 pages.
Notification of Allowance dated Mar. 15, 2019 in Korean Patent Application No. 10-2016-7032854. 10 pages, (includes: partial English translation, complete English translation of the claims).
"Notification of the Third Office Action," dated Aug. 22, 2019 in Chinese Application No. 201580028712.7. 18 pages (includes English translation).
"Notification of the Second Office Action," dated May 30, 2019 in Chinese Patent Application No. 201580028712.7. 9 pages (Includes English translation).
"Rejection Decision," dated Nov. 28, 2019 in Chinese Patent Application No. 201580028712.7. 9 pages includes English translation.
"Notification of Reexamination," dated May 12, 2020 in Chinese Patent Application No. 201580028712.7. 18 pages includes English translation.

* cited by examiner

ANSWERING A CALL WITH CLIENT THROUGH A HOST

CROSS-REFERENCES TO RELATED APPLICATIONS

This application is a continuation of U.S. patent application Ser. No. 14/475,390, entitled "ANSWERING A CALL WITH CLIENT THROUGH A HOST", filed Sep. 2, 2014, which claims priority from and is a nonprovisional application of U.S. Provisional Application No. 62/005,534, entitled "ANSWERING A CALL WITH CLIENT THROUGH A HOST" filed May 30, 2014, the entire contents of each are herein incorporated by reference for all purposes.

The present application is also related to U.S. Provisional Applications:
62/005,550 entitled "ANSWER AND HOLD WITH CLIENT AND HOST" by Rauenbuehler et al. (Ref. No. P23172USP1), filed May 30, 2014;
62/005,606 entitled "CLIENT APPLICATIONS COMMUNICATING VIA A USER TUNNEL" by Tung et al. (Ref. No. P23188USP1), filed May 30, 2014;
62/005,565 entitled "PROXIED PUSH" by Pollack et al. (Ref. No. P23053USP1), filed May 30, 2014;
62/005,336 entitled "SMS PROXYING" by Circosta et al. (Ref. No. P23192USP1), filed May 30, 2014;
62/005,505 entitled "MANAGING CONNECTIONS OF A USER DEVICE" by Schobel et al. (Ref. No. P23295USP1), filed May 30, 2014;
62/005,565 entitled "APPLICATION-LEVEL ACKNOWLEDGEMENTS" by Pollack et al. (Ref. No. P23189USP1), filed May 30, 2014;
62/005,586 entitled "MESSAGES WITH ATTENUATING RETRANSMIT IMPORTANCE" by Pollack et al. (Ref. No. P23190USP1), filed May 30, 2014;
62/005,799 entitled "PROTOCOL SWITCHING IN INTER-DEVICE COMMUNICATION" by Prats et al. (Ref. No. P22319USP1), filed May 30, 2014; and
62/005,990 entitled "USER INTERFACE FOR PHONE CALL ROUTING AMONG DEVICES" by Coffman et al. (Ref. No. P23298USP1), filed May 30, 2014, which are hereby incorporated by reference for all purposes. The present application is also related to U.S. Provisional Application 61/953,591 entitled "DYNAMIC LINK ADAPTATION FOR IMPROVED LINK MARGIN," by Liu et al., filed Mar. 14, 2014, which hereby incorporated by reference for all purposes.

BACKGROUND

The present disclosure relates to relay of audiovisual (AV) communications between devices as part of a call.

With the continuing proliferation of different types of networked devices, a single user that in the past may have only had one computer or one phone may now have a desktop computer, a laptop computer, a mobile phone, a tablet, networked wearable devices, networked home appliances, and other networked devices. Managing communications in such an environment is an increasingly complex task. Embodiments described herein may include devices, systems, and methods for managing such communications.

BRIEF SUMMARY

Embodiments can provide systems, apparatuses, and methods for answering a call with a client through a host. Client devices and host devices are provided. A client device may be used to initiate or answer calls using a host device connected to a network. For example, when a phone operating as a host device receives an incoming call from a network, the phone may communicate the presence of the incoming call to one or more client devices such as laptop, desktop, tablet, or wearable devices that are associated with the host device. When an answer call selection is made at a client, a call answered communication may be sent from the client device to the host device. The host device may then communicate with the network to connect the call to the host, and when the call is connected, the host may hand-off the call to the client that sent the call answered communication.

Other embodiments are directed to systems, portable consumer devices, and computer readable media associated with methods described herein.

A better understanding of the nature and advantages of embodiments of the present invention may be gained with reference to the following detailed description and the accompanying drawings.

DETAILED DESCRIPTION

Embodiments described herein relate to the use of a first device for accessing a call or communication on a second device. In particular, embodiments relate to the use of a host device, such as a mobile phone, as a relay for accessing a call on a different client device, such as a tablet, laptop, wearable device, or other networked device.

In one embodiment, a host device of a user can relay a phone call from a second party to a client device of the user. For example, when a phone operating as a host device receives an incoming call from a network, the phone may communicate the presence of the incoming call to one or more client devices such as laptop, desktop, tablet, or wearable devices that are associated with the host device (e.g., a user has paired the two devices).

In another embodiment, a client device of a user can be used to initial a call to a second party via a host device of the user. For example, when an answer call selection is made at a client, a call answered communication may be sent from the client device to the host device. The host device may then communicate with the network to connect the call to the host. When the call is connected, the host may hand-off the call to the client that sent the call answered communication.

For example, in certain embodiments, a cellular phone may have a set of relay settings selected. The phone may interact with an identity service to associate the phone with an identity or account, and to thereby identify any number of client devices that are also associated with the identity or account. When a call is received, the cellular phone may automatically notify, for example, an associated tablet and an associated wearable device that share an identity with the phone. When the answer call button is selected on the tablet, the cellular phone may relay the call to the tablet, and notify the wearable device that the call has been answered. The cellular phone may continue to relay call information to and from the tablet as part of the call until the call is transferred back to the phone or disconnected. Thus, if a user is using a tablet, laptop, or wearable device when a call comes in on the user's phone, but the user does not know where their phone is, the user can answer the call from another device, and either use the device for the call, or use the device temporarily until the user finds the phone and transfers the call to the phone. Any number of different client devices may be used as part of such a system, including networked tablets, watches, home appliances, and so on.

I. Introduction

Examples of systems, devices, and methods that may be used to implement certain embodiments are described below, along with non-exhaustive examples of selected variations and alternative embodiments that may be implemented.

A. System

Figure 1:
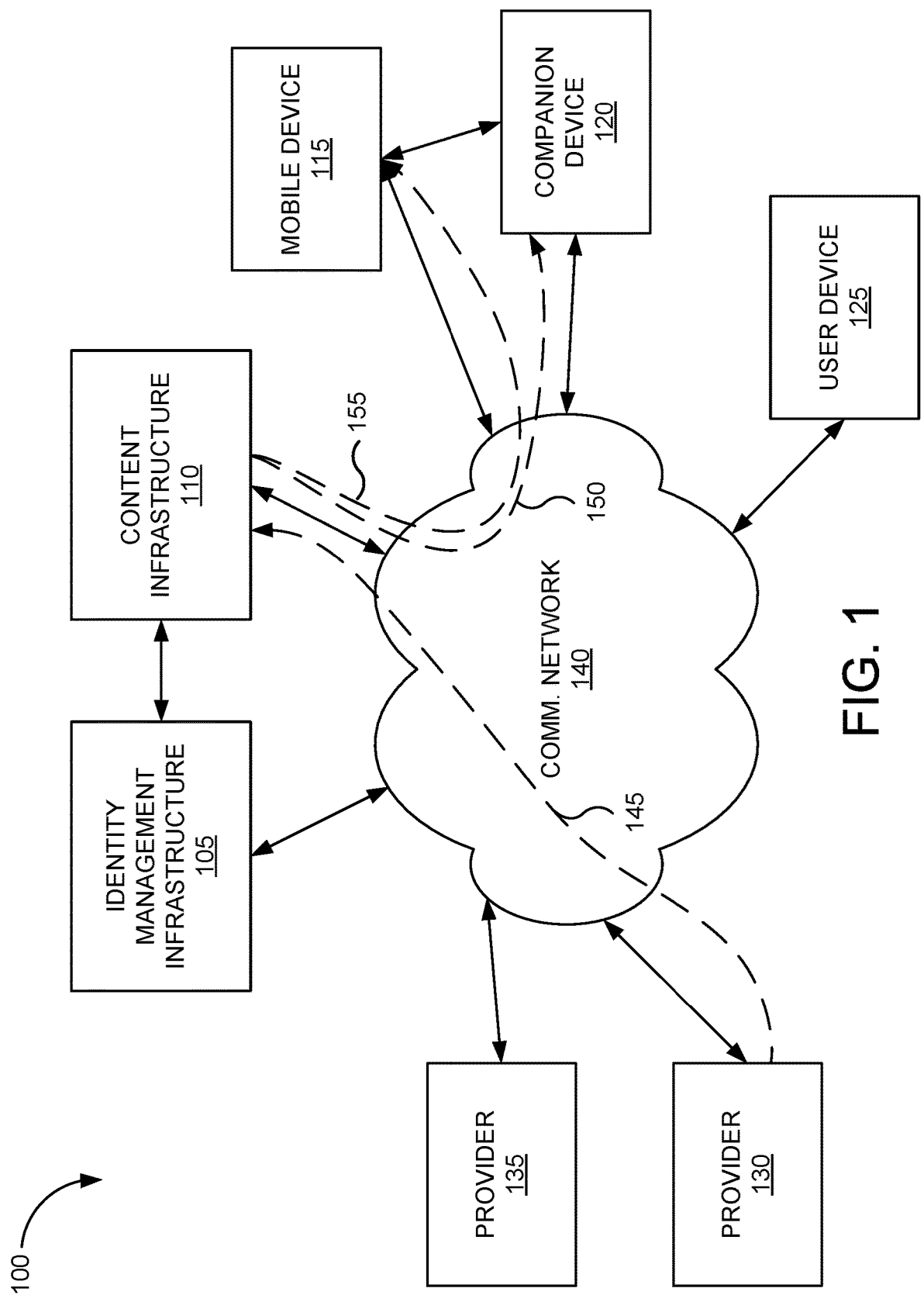
FIG. 1 is a block diagram of a system composed of one or more clients, hosts (e.g., a companion device), and servers communicating messages and calls among each other according to various embodiments.

FIG. 1 is a block diagram of a system 100 composed of one or more clients, hosts (e.g., a companion device), and servers communicating messages and calls among each other according to various embodiments. FIG. 1 and other figures are merely illustrative of an embodiment or implementation, or of aspects of an embodiment or implementation disclosed herein, and should not limit the scope of any invention as recited in the claims. One of ordinary skill in the art may recognize through this disclosure and the teachings presented herein other variations, modifications, and/or alternatives to those embodiments or implementations illustrated in the figures. FIG. 1 is one example of a system which may use relay via a host or mobile device to answer a call and enable the call to be performed with a client or companion device as an endpoint of the call. The devices in system 100 can include hardware and/or software elements.

In one embodiment, system 100 includes an identity management infrastructure 105 (i.e., one or more servers that implement an identity management service, authorization service, and/or authentication service), content infrastructure 110 (i.e., one or more servers that implement a voice/video call service, a messaging service, and/or a push notification service), mobile device 115, companion device 120, user device 125, provider 130, provider 135, and communications network 140. As illustrated, identity management infrastructure 105, content infrastructure 110, mobile device 115, companion device 120, user device 125, provider 130, and provider 135 are each capable of communicating with and through communications network 140 (representing the Internet, wide area networks (WANs), metropolitan area networks (MANs), local area networks (LANs), wireless area networks (WiLANs), radio access network (RANs), public switched telephone network (PTSN), etc., and/or combinations of the same). As illustrated, mobile device 115 can communicate directly with companion device 120 without utilizing communications network 140.

Identity management infrastructure 105 may be implemented in various embodiments using a single server computer system or may include multiple server computer systems, web servers, application servers, networks, interconnects, and the like. In various aspects, identity management infrastructure 105 provides management of individual entities, their authentication, authorization, and privileges within or across systems, such as content infrastructure 110. Identity management services provided by identity management infrastructure 105 can include technologies and services such as Active Directory, identity providers, password managers, access control providers, single sign-on (SSO) services, OAuth, security token services, or the like.

In various embodiments, identity management infrastructure 105 maintains information that authenticates the identity of a managed entity (such as a user, organization, and any associated devices, resources, services, applications, or the like). Identity management infrastructure 105 can verify that an entity is who/what it claims to be using a password, biometrics such as a fingerprint, a distinctive behavior such as a gesture pattern on a touchscreen, challenge-response protocols, one-time passwords (OTPs), 2-way authentications, and other techniques. Identity management infrastructure 105 further can manage authorization information that defines what operations an entity can perform in the context of a specific application, service, or resource. Some authorizations may be based on a role, device type, application, application type, or the like associated with a managed entity. Users are granted roles often related to a particular job or job function. Identity management infrastructure 105 can also manage descriptive information about managed entities and how and by whom that information can be accessed and modified. As part of identity management, one or more host devices may be identified and associated with one or more client devices, such that incoming calls to the host devices may be relayed to the client devices, and such that the client devices may be used to initiate relayed calls using the host devices.

In some embodiments, identity management infrastructure 105 creates digital identities for managed entities encompassing, for example, entity identifying information (PII) and ancillary information. In one aspect, a managed entity can have multiple digital identities and each digital identity can encompass multiple attributes. For example, a user can have a user identifier (e.g., a phone number, e-mail, etc.) that is linked to multiple devices. In addition to creation, deletion, modification of digital identities, identity management infrastructure 105 can manage ancillary entity data for use by services, such content infrastructure service 110.

In further embodiments, identity management infrastructure 105 can store capabilities of each device associated with a user identifier. Examples of device capabilities include whether a device includes a specific type or version of hardware, whether a device includes a specific type or version of software (e.g., operating systems or applications), whether a device is capable of performing a specific function such as placing and receiving phone calls or sending and receiving short message service (SMS)/multimedia message service (MMS) messages, whether a device is capable of maintaining connections with other devices, or the like. The list of devices associated with a user can be sent to and stored at any other device of that user, such as mobile device 115 and companion device 120 when associated with the same user identifier. Identity management infrastructure 105 can determine and collect capabilities of a device when it is registered and associated with the user identifier. Identity management infrastructure 105 can update the capabilities of a device periodically, for example, when the device re-registers or communicates with one or more services managed by identity management infrastructure 105.

In various embodiments, identity management infrastructure 105 can receive a single user identifier, which is used to determine device identifiers for devices associated with the user identifier. The device identifier for each device can be unique relative to other devices of a user. During entity registration, in order to access services or resources managed by identity management infrastructure 105, one or more user or other identifiers and a unique entity or device identifier (UID) may be combined to generate an entity or device token.

In various embodiments, the token is encrypted by applying a hashing algorithm (e.g., SHA-0, SHA-1, SHA-2, MD5, Whirlpool, or other hashing algorithms). The token generated and encrypted for an entity can remain constant in various embodiments. Once a token has been generated and encrypted by identity management infrastructure 105, the token can be sent back to the entity. The entity in some aspects can then distribute the token to services or resources managed by identity management infrastructure 105 or other third party services for a variety of purposes relating to authentication, authorization, accounting, or the like of the entity at those managed services or resources or the trusted delivery of content to the entity by the third parties.

Content infrastructure 110 may be protected by and/or accessible to entities managed by identity management infrastructure 105. Content infrastructure 110 may be implemented in various embodiments using a single server computer system or may include multiple server computer systems, web servers, application servers, networks, interconnects, and the like.

Content infrastructure 110 can provide content to mobile device 115, companion device 120, and user device 125 as well as to other devices and entities. Examples of content include a text message, a multimedia message, an impending calendar event, an audio/video call (e.g., using VOIP), or a notification of new data on a remote server. In one embodiment, the content can originate from one or more sources managed by identity management infrastructure 105 or provided directly by content infrastructure 110. In other embodiments, the content can originate from other sources. For example, content may originate from any one of mobile device 115, companion device 120, user device 125, and providers 130 and 135.

In another example, content may be received from other sources such as the Internet, cellular networks, public switched telephone networks, and the like. Content infrastructure 110 can then route the content to mobile device 115, companion device 120, user device 125, and providers 130 and 135. In one embodiment, content infrastructure 110 may route through the infrastructure an SMS message received from or destined to a cellular network. In another embodiment, content infrastructure 110 may route through the infrastructure a voice call received from or destined to a public switched telephone network.

In some embodiments, the content sent to mobile device 115 can be forwarded to companion device 120 for delivery to mobile device 115. Companion device 120 can also act and send signals on behalf of mobile device 115. In these embodiments, companion device 120 acts as a main or intermediary device and mobile device 115 acts as a proxied device. Content infrastructure 110 can coordinate how and whether companion device 120 can act and send signals on behalf of mobile device 115.

In some embodiments, content infrastructure 110 can send content to more than one device, when appropriate. A user may be associated with both mobile device 115 and companion device 120. Content infrastructure 110 may route the content to both mobile device 115 and companion device 120, such as to have a VOIP phone call ring on both devices or to have a message appear in the inbox of the same application installed on both devices. In other embodiments, content is sent to only one device, e.g., to companion device 120, which may forward a call to mobile device 115. When a call is being forwarded to a device, a phone number can identify which device is to receive the phone/video call, and that device can relay a call as appropriate.

In one aspect, content can include of one or more pieces of data, such as a device identifier (or token) as discussed above and a payload. A device token can be provided in content originating from a provider (e.g., provider 130 and/or 135), a device of a same user (e.g., from either mobile device 115 or companion device 120), or a device of another user (e.g., user device 125), together with any payload the provider seeks to have delivered using content infrastructure 110. The device token can contain information that enables content infrastructure 110 to locate a device on which a particular service or client application is installed and that is registered to receive the content. The payload may include new information received at a server application or a reference to where the information is to be found. The payload may further include a property list that specifies how the user is to be alerted about this new information by the particular service or client application.

An alert can come in a variety of forms. In one example, content can be displayed to a user as an alert message or other visual representation, such as a badge associated with an application icon. Availability of the content further can be announced by playing a sound when an alert or badge is shown. When a user is notified that an application or service has a message, event, or other content data for them, they can launch the application or service and see the details by either viewing the content, viewing information contained in a push notification, having the client application retrieve the referenced information, or the like. The user can also choose to ignore the notification, in which case the application is not activated.

As alluded to above, content infrastructure 110 can include push notification services that in addition to or in the alternative of routing content implement mechanisms to give client applications of push providers that are on user devices the ability to let users know that new content is available at one or more server applications, is on the device, or is incoming. A push provider (or simply provider) as used herein can refer to an entity having information to be forward and/or delivered using a push notification infrastructure. Generally, software developers (acting as providers) originate notifications in their server software when new data is available for users. A provider connects its server software with content infrastructure 110 through a persistent and secure channel. Identity management infrastructure 105 can ensure that the provider is authenticated (e.g., that the provider is who the provider alleges to be) and authorized to connect and utilizes content infrastructure 110 in a trusted manner.

While monitoring for incoming data intended for its client applications, when new data for an application arrives, the provider prepares and sends in one aspect a notification through its channel connection to content infrastructure 110, which pushes the notification to a push consumer or destination target device. Identity management infrastructure 105 can also ensure that the consumer or destination target device is authenticated and authorized to connect to and utilizes services of content infrastructure 110 in a trusted manner. A push consumer (or simply consumer or destination) can refer to an entity designated to receive information forwarded and/or delivered using content infrastructure 110. Although the above describes a provider as the originator of content or a notification of available content for the sake of simplicity, a provider in one instance may in turn become a consumer in another, and vice versa. Additionally, mobile device 115 may be a provider of content to companion device 120, and vice versa as well has provider 130 providing content to provider 135, and vice versa.

In one example of operation of content infrastructure 110, one or more server computers provide, provision, manage, and otherwise operate the push notification service for propagating information between provider 130, provider 135, mobile device 115, companion device 120, and user device 125. Each may establish at least one persistent connection (e.g., an accredited and encrypted Internet protocol (IP) connection) with content infrastructure 110 to originate and/or receive content over this persistent connection. As noted above, each and their connections can be authenticated and authorized by identity management infrastructure 105.

If a notification delivered by content infrastructure 110 for an application associated with a user's device arrives when the application is not running, the user's device may alert the user that the application has data waiting for it as discussed above. Content infrastructure 110 may also provide a default quality-of-service component that provides store-and-forward capabilities. If content infrastructure 110 attempts to deliver a notification but a target device is offline, the notification can be stored for a limited period of time, and delivered to the device when it becomes available. In some embodiments, all recent notification for a particular application is stored. In some embodiments, only one recent notification for a particular application is stored. For example, if multiple notifications are sent while the device is offline, each new notification causes the prior notification to be discarded. This behavior of keeping only the newest notification is referred to as coalescing notifications. In other embodiments, if the device remains offline for a long time, any notifications that were being stored for it may be discarded.

Provider 130 and provider 135 may be implemented in various embodiments using a single server computer system or may include multiple server computer systems, web servers, application servers, networks, interconnects, and the like. In various aspects, provider 130 and provider 135 provide client applications that run on mobile device 115, companion device 120, and user device 125 and server applications that provide one or more services to which the client applications can connect. Provider 130 and provider 135 may seek to notify the client applications accessible to one or more of mobile device 115, companion device 120, and user device 125 that information is available to their respective users.

In one aspect, a push provider is a software developer, company, or organization that maintains server software configured to interact with one or more client applications on one or more of mobile device 115, companion device 120, and user device 125. Provider 130 and provider 135 each connect with content infrastructure 110 through a persistent and secure channel while monitoring incoming data intended for their client applications. In one embodiment, provider 130 and provider 135 connect over a binary interface that provides a high-speed, high-capacity interface, e.g., using a streaming TCP socket design in conjunction with binary content. The binary interface may be synchronous or asynchronous. For each interface, TLS (or SSL) may be used to establish a secured communications channel.

Mobile device 115, companion device 120, and user device 125 may be each embodiment as a single device, a single computer system, multiple devices, or multiple computer systems. In various aspects, mobile device 115, companion device 120, and user device 125 although labeled differently for convenience can each be embodied as a mobile device, a wearable device, or other mobile device (e.g., a laptop, palmtop, mobile phone, smart phone, multimedia phone, portable media player, GPS unit, mobile gaming systems, etc.). In addition to or in the alternative, companion device 120 and user device 125 can be embodied as described above as well as being embodied as personal computer systems, mainframes, server computer systems, cloud services, or the like. Mobile device 115, companion device 120, and user device 125 may include a variety of technologies that provide a communications connection. Some examples of connection technologies include wired connections (e.g., Ethernet, fiber, digital subscriber line (DSL), etc.) and wireless connections (e.g., WiFi, Bluetooth, WiMax, 3G, 4G, LTE, etc.).

In one aspect, mobile device 115, companion device 120, and user device 125 host one or more of a variety of client applications that communicate with one or more server applications provided by one or more providers (e.g., providers 130 and 135). These client applications may include applications specific to the intended function of a device (such as telephony applications or GPS applications) as well as e-mail clients, update/upgrade clients, news clients, web/blog clients, podcast clients, social networking clients, or other types of client applications where notification messages may be sent. These client applications may represent to a user one or more notification messages received using content infrastructure 110. Notifications can be represented to users in one or more manners defined by an operating system of the device, a graphical user interface toolkit, and/or the applications themselves. Some examples of representations of notifications include a new e-mail indicator, a new news item indicator, a new podcast indicator, a change of on-line status of a social networking friend, and the like. In various embodiments, another service operating on a device can handle notifications for client applications.

As discussed above, mobile device 115, companion device 120, and user device 125 may receive an identifier (or device token) when a client application initially connects with content infrastructure 110 in order to receive push notifications. Providers 130 and 135 can use the token, or include the token, with any content or notification message so that it can be appropriately forwarded back to the device using content infrastructure 110. In various embodiments, to ensure trust, a provider communicates the token every time it connects with content infrastructure 110. Content infrastructure 110 can decrypt the device token and validate using identity management infrastructure 105 that the token was generated for the destination device. To validate in one embodiment, content infrastructure 110 ensures that the device identifier contained in the token matches the device identifier in a device certificate used when the device registered with identity management infrastructure 105.

Referring to an operation of system 100 illustrated in FIG. 1, in one embodiment, the operation can be to forward or otherwise communicate a notification message from provider 130 to companion device 120 as illustrated by path 145. In various embodiments, provider 130 sends an authentication Secure Sockets Layer (SSL) certificate upon an initial connection with content infrastructure 110. Identity management infrastructure 105 can authenticate and authorize provider 130 as a registered and authorized sender of push notifications. This SSL certificate can also be configured with additional user-defined data. Identity management infrastructure 105 can utilizes the additional user-defined data to identify provider 130 in a trusted fashion. Other secure communications protocols (e.g., cryptographic protocols such as Transport Layer Security (TLS), etc.) can be used in other embodiments.

In some embodiments, where provider 130 is associated with a particular application (e.g., Email, Facebook, or Twitter) and includes additional identifying (e.g., user-defined) data within the SSL certificate, identity management infrastructure 105 can not only authenticate provider 130, but also automatically provision push service for provider 130 and the application utilizing content infrastructure 110. In other words, identity management infrastructure 105 can automatically extract any additional identifying data from the authentication certificate and have content infrastructure 110 attach the additional identifying data (or a portion of the data) to content (e.g., push-notification messages). In some embodiments, the additional identifying data may identify a topic or feed associated with provider 130 (or an application of provider 130) to which a user might subscribe via content infrastructure 110. Thus, the additional information in the authentication certificate can be leveraged to direct content to devices that have subscribed to the topic/feed or requested information regarding the topic/feed. In this way, push service is automatically provisioned for provider 130.

Once provider 130 is trusted, content infrastructure 110 receives the notification message from provider 130. As discussed above, the notification message may include a device token. Having received the notification message from provider 130, content infrastructure 110 determines the destination for the notification message. In various embodiments, the destination is determined based on the device token that is sent along with notification message. In some embodiments, it is not necessary to send destination information as part of a token. By determining or extracting the destination from the device token or otherwise obtaining destination information for the content, content infrastructure 110 can then determine whether the destination is "online" or otherwise accessible.

If the destination is online, in one embodiment, content infrastructure 110 may then route the notification message to the destination companion device 120 illustrated by path 150, for example, via a persistent connection maintained by companion device 120 with content infrastructure 110. If the destination is "offline" or otherwise inaccessible to content infrastructure 110, the content may be stored and delivery retried at a later time. Content infrastructure 110 can in addition to or alternatively route the notification message to mobile device 115 illustrated by path 155, for example, via a persistent connection maintained by companion device 120 with content infrastructure 110. Content infrastructure 110 thus can route content to a single device, multiple devices at the same time, or to one device for delivery to another device.

B. Content Infrastructure

Figure 2:
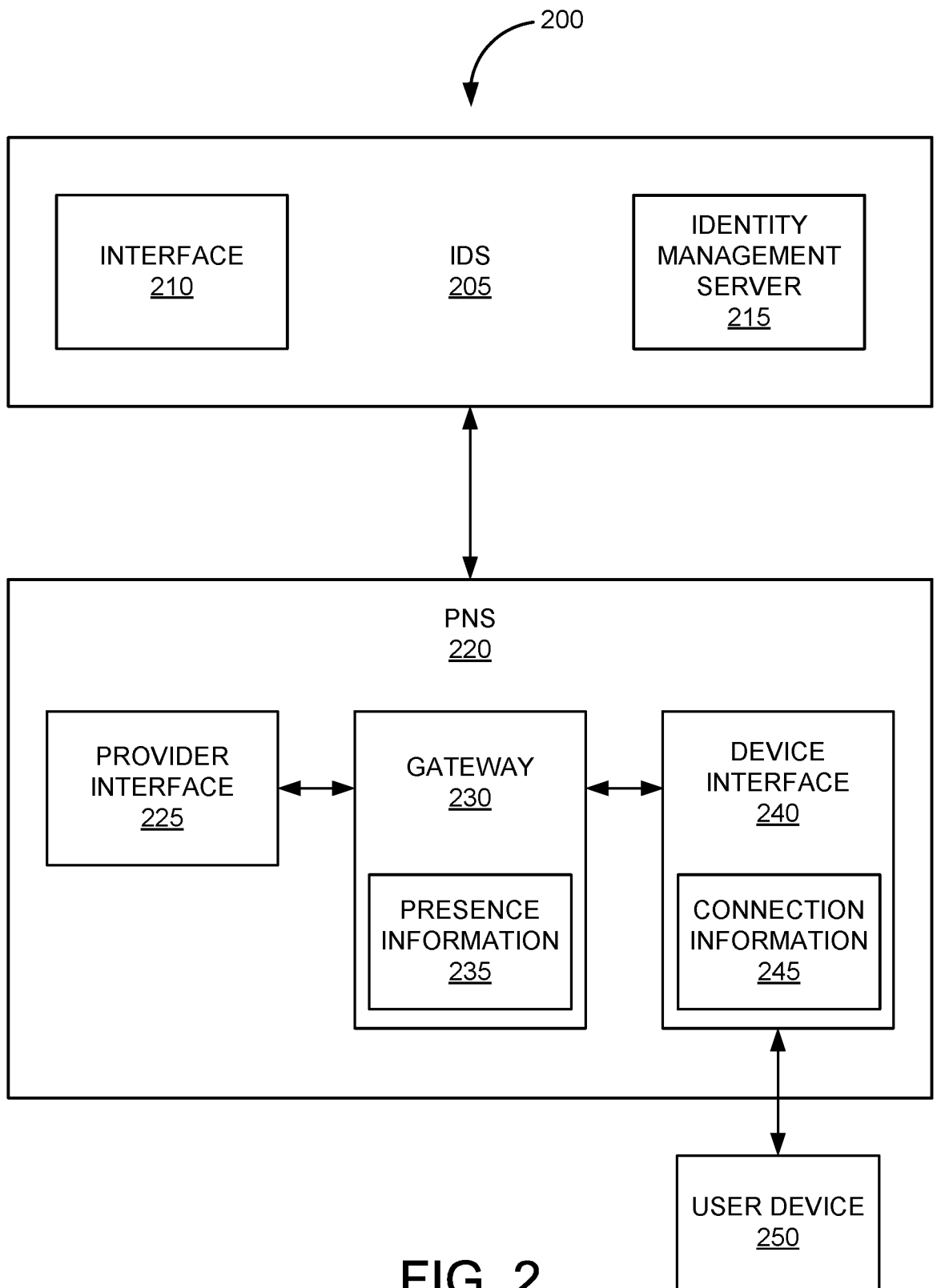
FIG. 2 is a block diagram of system that may be used, at least in part, to facilitate relay for answering and placing a call according to various embodiments.

FIG. 2 is a block diagram of system 200 that may be used, at least in part, to facilitate relay for answering and placing a call according to various embodiments. In particular, IDS services as described herein, including IDS 205, may be used to facilitate discovery and communication between a host device used as a relay and a client device used as a call endpoint. As recited herein mobile device 115 of FIG. 1 may be considered a host device, and companion device 120 may be considered a client device for the purposes of a relay system. System 200 may be used in a relay system and may be implemented in various embodiments using a single server computer system or may include multiple server computer systems, web servers, application servers, networks, interconnects, and the like. System 200 can be embodied as content infrastructure of FIG. 1 in various embodiments.

In particular, FIG. 2 illustrates various examples of forwarding content (e.g., notification messages and phone/video calls) between devices, e.g., between providers and mobile devices, or between a sending device of one user and receiving devices of another user). In these examples, system 200 is shown with identity services (IDS) 205 having interface 210 and identity management server (IMS) 215 and push notification services (PNS) 220 having provider interface 225, gateway 230 having presence information 235, device interface 240 having connection information 245, and user device 250. Each service may be implemented using hardware and/or software elements.

In one aspect, IDS 205 may be embodied as or form part of identity management infrastructure 105. IDS 205 may be implemented in various embodiments using a single server computer system or may include multiple server computer systems, web servers, application servers, networks, interconnects, and the like. Interface 210 can enable an entity (e.g., mobile device 115 or provider 130) to connect (e.g., via a network) in order to take advantage of service provided by IDS 205. Interface 210 may incorporate load balancing and other connection management techniques allowing entities to communicate with Identity management server 215.

In one embodiment, an entity sends information such as an authentication certificate that is received via interface 210 upon an initial connection to IDS 205 or to a service, resource, or application managed by IDS 205 (e.g., PNS 220). Identity management server 215 can authenticate and authorize a device, user, or organization sending the information as a registered and authorized entity. One or more types of services can be authorized or provisioned for the device, user, or organization (e.g., call services, instant messaging services, chat services, notification services, etc.). To support a security model for PNS 220, entities and their devices may be required to possess certain certificates, certificate authority (CA) certificates, or tokens.

In one embodiment, each provider of content uses a unique provider certificate and private cryptographic key for validating their connection with PNS 220. This certificate can be provisioned by identity management server 215 and identify the provider and/or a particular topic published by the provider. In general, the topic is a bundle ID of a client application. The provider may optionally wish to validate the service, to which the provider is connected, using a public server certificate provided by PNS 220. In various aspects, the provider uses the public server certificate passed to it by identity management server 215 when registering to authenticate the service to which the provider has connected.

Identity management server 215 may also issue to each device, which desires to receive content, a unique private key and certificate that the device uses to authenticate itself to identity management server 215 and establish a connection to PNS 220. A device usually obtains a device certificate and key from identity management server 215 during device activation and stores them in a keychain. The device also holds its particular device token, which it receives during the service connection process. Each client application that utilizes PNS 220 is responsible for delivering this token to its content provider.

Identity management server 215 may store any necessary certificates, CA certificates, and cryptographic keys (private and public) for validating connections and the identities of providers and devices.

In this example, once the entity is trusted, system 200 allows the entity to utilize push notification services provided by PNS 220. PNS 220 may be implemented in various embodiments using a single server computer system or may include multiple server computer systems, web servers, application servers, networks, interconnects, and the like. The entity may be a provider or other notification provider desiring to connect with PNS 220 (e.g., via a network). As alluded to above, in one embodiment, provider interface 225 provides a high-speed, high-capacity interface allowing push notification providers to communicate with PNS 220. Provider interface 225 may incorporate load balancing and other connection management techniques allowing entities to communicate with PNS 220. Although provider interface 225 is shown as being linked to gateway 230, provider interface 225 may be incorporated into gateway 230 or device interface 240. As discussed above, a user device can be a provider of content in various embodiments as well as be a destination of content routed using PNS 220.

Gateway 230 may be implemented in various embodiments using a single server computer system or may include multiple server computer systems, web servers, application servers, networks, interconnects, and the like. Gateway 230 can determine the destination of content (e.g., push messages or call messages) received via provider interface 225 or device interface 240. In various embodiments, gateway 230 can determine a destination based on presence information 235. In one aspect, presence information 235 is maintained using a device's push token. Accordingly, when a push notification is received at gateway 230 directed to a particular push token, gateway 230 can perform a lookup to determine whether there is a TCP socket descriptor associated with that push token. The socket descriptor can provide the TCP socket information and other networking information needed to transmit the push notification. In various aspects, presence information 235 includes mappings between authenticated entities and their connections to PNS 220. These connections can be utilized by PNS 220 for delivering content, notifications, and the like or otherwise communicating with an entity. Each mapping may be indicative of at least one entity and at least one connection mechanism to that entity, such as a network socket connection or other connection identifier. For example, a mapping may identify a destination device by its device token or a provider by its provider identifier. Additional information may be included in each mapping in order to facilitate communication with the entity's device.

In some embodiments, in order to scale handling of connections from an increasing number of users, devices, and providers utilizing services of PNS 220, device connections in presence information 235 (or the devices themselves) may be managed according to at least one grouping or logical partition called a zone. Functions performed by gateway 230 may be partitioned out to multiple servers that are assigned dynamically to handle these groupings or zones. For example, one or more servers might manage, for a period of time, delivery to destinations assigned to one zone and then be switched, or reconfigured, to manage the delivery of notifications to destinations assigned to a different zone at a later time. Each of these servers may also include routing information that is used to route content to other servers associated with a particular zone of the destination of the content. Thus, when content is received at one server, another server designed to handle a predetermined zone is determined and the content can be forwarded to the appropriate server. In one aspect, functions performed by gateway 230 may be partitioned out to multiple servers to handle corresponding device connections (e.g., device interface 240).

In various embodiments, gateway 230 is linked to device interface 240. Device interface 240 provides an interface to communicate with user device 250. Device interface 240 may incorporate load balancing and other connection management techniques allowing devices to communicate with PNS 220. Although device interface 240 is shown as being linked to gateway 230, device interface 240 may be incorporated into gateway 230 or provider interface 225.

Device interface 240 in these examples allows presence information 235 to be generated when device interface 240 is connected to user device 250. User device 250 can assert its presence to PNS 220 upon establishing a persistent connection. Device interface 240 then generates a device/connection mapping in connection information 245. Device interface 240 can back-propagate connection information 245 to gateway 230 allowing gateway 230 to generate a device/connection mapping in presence information 235. In one aspect, presence information 235 includes a device/courier mapping or link allowing gateway 230 to determine an appropriate courier that acts as device interface 240 connected to user device 250. The courier utilizes connection information 245 (including any device/connection mappings or links) allowing the courier to determine connection information specific to user device 250 that can be used to deliver content to user device 250. In another aspect, presence information 235 and connection information 245 may be substantially identical in that they include correspondences between a given device and its connection with PNS 220.

In various embodiments, a device wishing to receive content via PNS 220 sends authentication information either upon an initial connection with device interface 240 or directly to IDS 205. Identity management server 215 can receive the authentication information either directly or indirectly and then authenticate and authorize the device or its associated user or organization as a registered and authorized entity. Once the device is trusted, PNS 220 is informed and PNS 220 thereafter manages any connections made between the device and PNS 220 (such as with device interface 240 in connection information 245). Device information available at device interface 240 in connection information 245 can be periodically back-propagated to gateway 230 to generate or update presence information 235.

When the device initially connects with PNS 220, PNS 220 provisions the device. In various embodiments, a zone is provisioned for the device as alluded to above. Despite a particular zone assignment for each device, devices may lose their connection with device interface 240 for various reasons. For example, a connection might be lost due to loss of cellular signal, or wi-fi signal, loss of power, or because a mobile device has changed geographic locations, etc. In other aspects, a connection may be intermittent as opposed to being persistent in order to conserve power or achieve other efficiency metrics.

When user device 250 attempts to reconnect to PNS 220, user device 250 can connect with any courier acting as device interface 240. In embodiments where device connections are assigned to at least one grouping or zone, device interface 240 may provision a connection with one or more servers of gateway 230 that are assigned to handle the zone of a connecting device. For example, if device interface 240 is connected to user device 250 that is assigned to zone 1, then device interface 240 can provision a connection with one or more servers responsible for managing zone 1. Device interface 240 may then back-propagate device information for user device 250 to the one or more servers responsible for managing zone 1. In similar fashion, device interface 240 may make connections with servers of different zones to back-propagate specific device information for devices associated with those respective zones ensuring that no matter where or how user device 250 connects to PNS 220, presence information 235 is up to date and available to determining how to route the content. In some embodiments, device interface 240 can be specific to a wireless carrier or internet service provider (ISP) allowing PNS 220 to support the protocols or physical connections specific to multiple third party entities.

According to one example, when gateway 230 receives content from provider interface 225, gateway 230 forwards the content received from provider interface 225 to device interface 240 based on its mappings in presence information 235. Device interface 240 can deliver the content received from gateway 230 to user device 250 for which information about a persistent connection is maintained in connection information 245.

Upon receiving content from gateway 230, device interface 240 can perform a lookup or otherwise consult its device connections in connection information 245 and send the content received from gateway 230 to the appropriate device, for example, over the persistent connection associated with user device 250. In one aspect, device interface 240 inspects the device token associated with the content to be delivered and determines whether a match is found between the device token and the connections that device interface 240 manages in connection information 245. Device interface 240 can deliver the content using the connection established by the device having the given device token.

In one example of operation, user device 250 subscribes to a particular application managed by a provider and desires to receive notification messages for that application via PNS 220. Thus, user device 250 calls the provider either directly via a communications network or utilizing PNS 220 and transmits its device token to the provider. The device token or its transmission may include not only a device's identification information but may include an encrypted combination of a device's UID and its zone identifier allowing PNS 220 to provision connection information for the device according to the appropriate resources allocated to the zone.

When the provider sends a notification message to the particular application on user device 250, the provider connects to PNS 220 using provider interface 225 and sends the message to gateway 230. Even if user device 250 is associated with a particular zone, the provider does not need to connect to any particular gateway of PNS 220 to successfully push a notification message to user device 250. For example, if gateway 230 receives content from provider interface 225 and the content has a device token, gateway 230 will look at the token and either route the message to an appropriate server of PNS 220 (which may route the message to device interface 240 or another courier of PNS 230) or route the message directly to device interface 240.

If gateway 230 is the designated gateway, gateway 230 sends/forwards the message to device interface 240 based on its device/courier mapping in presence information 235 in some embodiments. Device interface 240 is then able to lookup its connections in connection information 245 and send the message to the device over the persistent connection established by the device with device interface 240. In summary, in cases where PNS 220 receives a message having a particular destination, a gateway of PNS 220 forwards that message directly to an appropriate courier of PNS 220 using a device/courier mapping that was established when a device connects to PNS 220. In further embodiments, gateway 230 can send/forward the message directly to user device 250 based on its device/connection mapping in presence information 235. Gateway 230 can generated this mapping information from various sources to each of which a device has established a connection.

II. Host and Client Device

Figure 3:
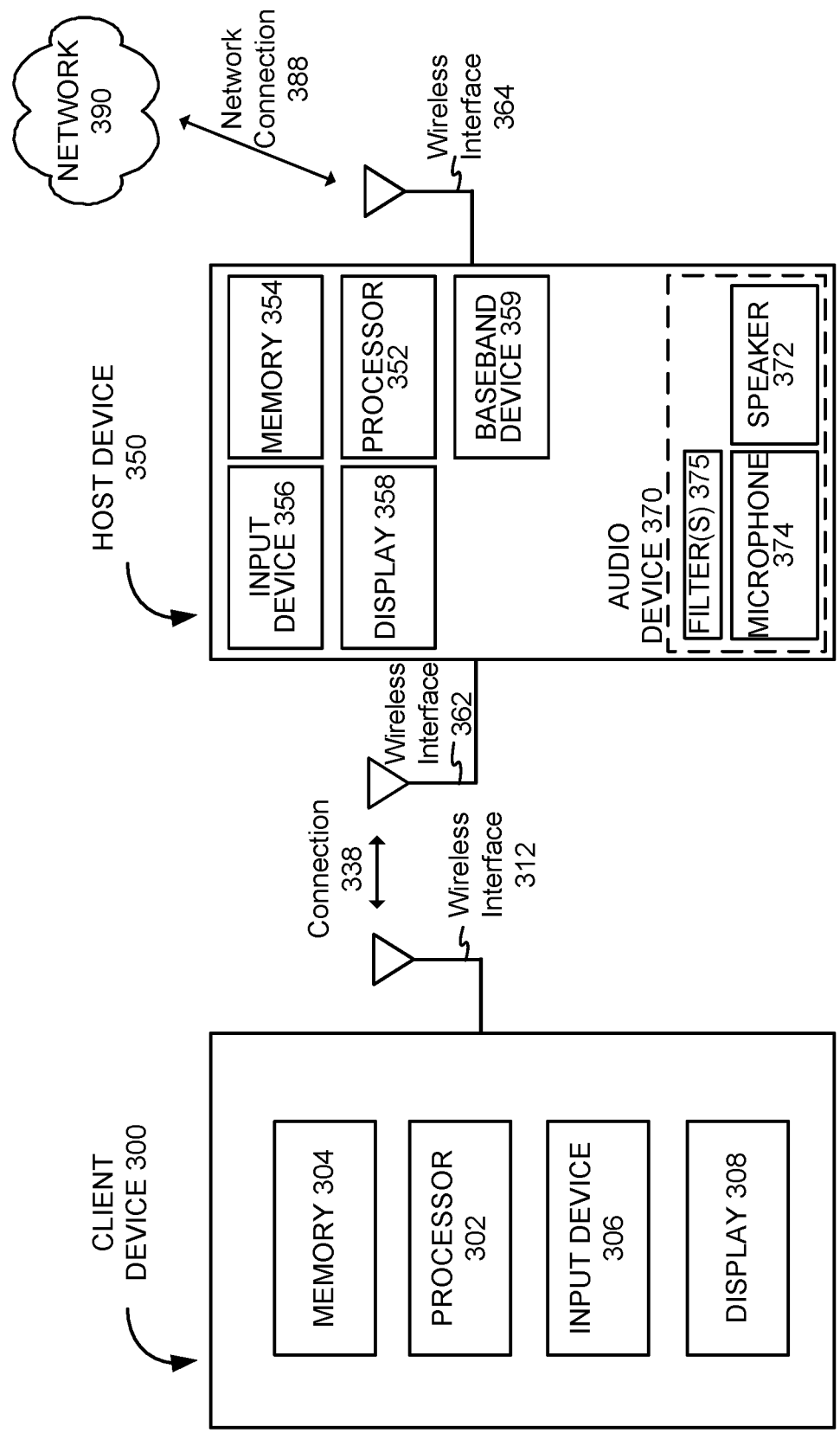
FIG. 3 is a diagram of a client device and an associated host device according to various embodiments.
Figure 4:
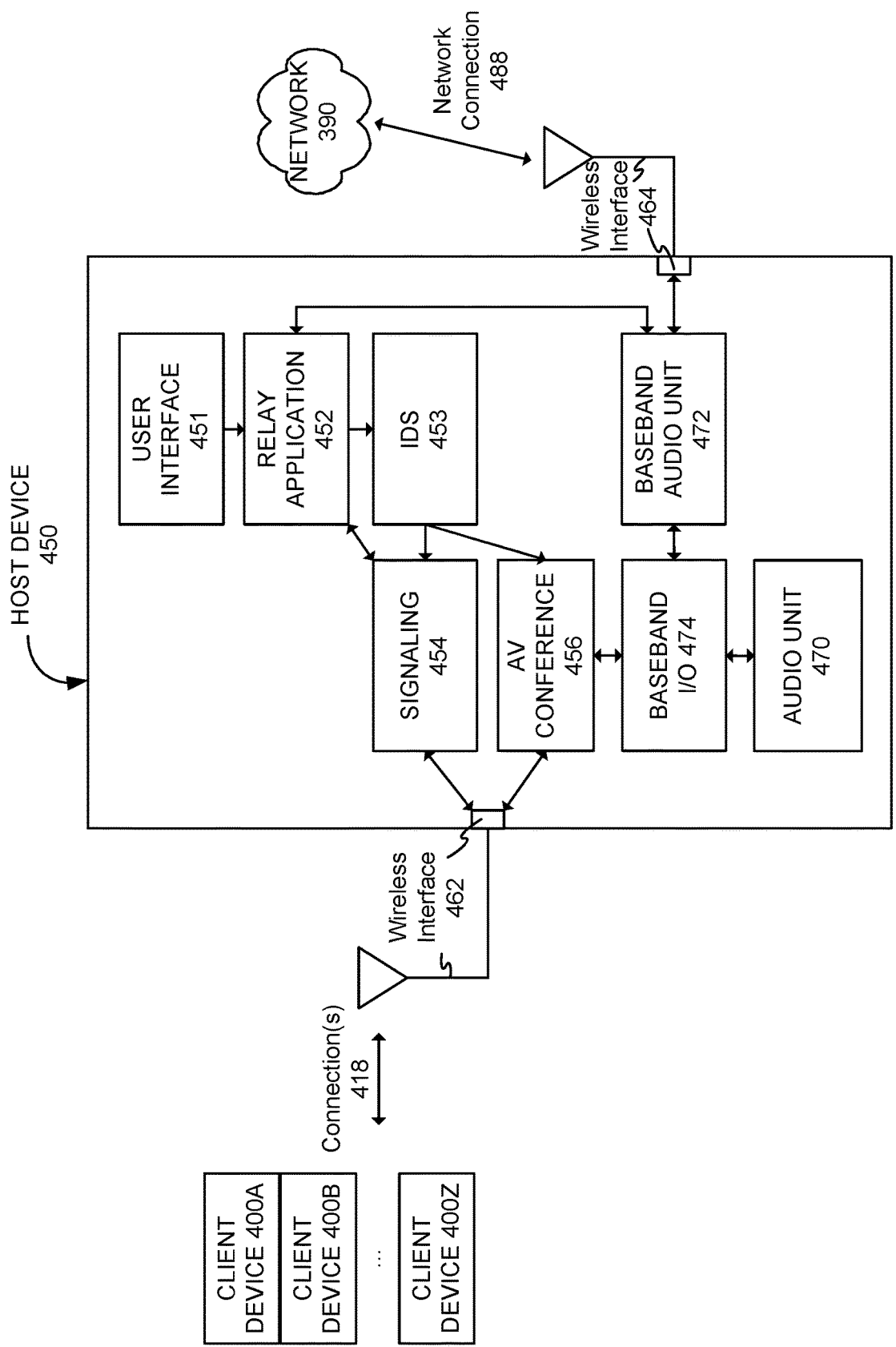
FIG. 4 is a diagram of a plurality of client devices and an associated host device according to various embodiments.

FIGS. 3 and 4 illustrate client devices and host devices that may be used in conjunction with or as part of systems 100 and 200 of FIGS. 1 and 2 to implement relay for answering a call. While two embodiments are illustrated by these figures, various implementations may include any number of client devices, host devices, and different networks which may be supported by the devices in a particular setup.

It should be apparent that the systems shown in FIGS. 3 and 4 illustrate one embodiment, and that other similar embodiments can have more or fewer components than what is shown. Other embodiments may also include different configurations of the illustrated components, while remaining within the scope of the innovations herein. The various components of host device 450 in particular as shown in FIG. 4 can be implemented in hardware, software, or a combination of both hardware and software, including one or more signal processing and/or application specific integrated circuits.

FIG. 3 illustrates an embodiment with client device 300, host device 350, and network 390. Client device 300 may be any device accessible by a wireless interface, including a desktop computer, a laptop computer, a smartphone, a tablet computer, a wearable device (e.g. a network enabled watch, earpiece, or necklace) a networked appliance (e.g. a network enabled refrigerator or clothes washer) media player, personal digital assistant, key fob, access card, multi-function device, game system, or any other such client device. Client device 300 comprises memory 304, processor 302, input device 306, display 308, and wireless interface 312. Embodiments of a client device capable of functioning as an endpoint of a call may additionally include speaker and microphone devices as part of an audio unit. Host device 350 includes processor 352, memory 354, input device 356, display 358, audio device 370, wireless interface 362, wireless interface 364, and baseband device 359.

Host device 350 may be any communication device capable of relaying an AV signal from a network 390 to a client device 300. Certain embodiments of host devices may have multiple communications interfaces, such that as part of the relay performed by a host device, the host device communicates with a network using one communication interface based on a first communication protocol, and a the host device communicates with a client device using a second communication interface different from the first communication interface and based on a second communication protocol different from the first communication protocol. Examples of such host devices may include smart phones, desktop computers, laptop computers, and other such network enabled computing devices.

Client device 300 may communicate with host device 350 via connection 338. Similarly, host device 350 may communicate with network 390 via connection 388. In further embodiments, client device 390 may also create a connection with one or more other networks including network 390. Different embodiments may implement connection 338, connection 388, or aspects of these connections using one or more communication protocols or technologies, including time division multiple access (TDMA), code division multiple access (CDMA), global system for mobile communications (GSM), Enhanced Data GSM Environment (EDGE), wideband code division multiple access (W-CDMA), Long Term Evolution (LTE), LTE-Advanced, WiFi (such as IEEE 802.11a, IEEE 802.11b, IEEE 802.11g and/or IEEE 802.11n), Bluetooth, Wi-MAX, voice over Internet Protocol (VoIP), near field communication protocol (NFC), a protocol for email, instant messaging, and/or a short message service (SMS), or any other suitable communication protocol, including communication protocols not yet developed as of the filing date of this document. A host or client device can include wireless circuitry as part of wireless interfaces, such as wireless interface 312, wireless interface 362, and wireless interface 364, that can communicate over several different types of wireless networks depending on the range required for the communication. For example, a short-range wireless transceiver (e.g., Bluetooth), a medium-range wireless transceiver (e.g., WiFi), and/or a long range wireless transceiver (e.g., GSM/GPRS, UMTS, CDMA2000 1×/EV-DO and LTE/LTE-Advanced) can be used depending on the type of communication or the range of the communication.

Connection 338 in particular may, in certain embodiments be implemented as a peer to peer (P2P) wireless connection directly between wireless interface 312 and wireless interface 362. In other embodiments, connection 338 may include multiple additional devices and sub-connections, including multiple access points, network routing connections, and communication servers.

Wireless circuitry may be used in conjunction with wireless interfaces such as wireless interfaces 312, 362, 364, 462 and 464 to send and receive information over wireless connections such as connections 338, 388, 418, and 488. Any device described herein may additionally include conventional circuitry such as an antenna system, an RF transceiver, one or more amplifiers, a tuner, one or more oscillators, a digital signal processor, a CODEC chipset, memory, etc. to enable various wireless connections as described herein.

Wireless circuitry may be coupled to processors such as processor 302 and processor 354 via peripherals interfaces. Voice and data information received by wireless circuitry may be sent to one or more processors via peripheral interfaces. One or more processors such as processors 302 and 352 may be configurable to process various data formats for one or more application programs stored on the memory of a device.

Processors 305 and 352 may run various software components stored in respective memories 304 and 354 to perform various functions for devices 300 and 350. In some embodiments, the software components include an operating system, a communication module (or set of instructions), and other applications (or sets of instructions). In different embodiments, a processor may be a single integrated circuit, a set of multiple integrated circuits, or any logic hardware that may be used to implement processing functionality.

An operating system executed by a processor can be any suitable operating system. The operating system can include various procedures, sets of instructions, software components and/or drivers for controlling and managing general system tasks (e.g., memory management, storage device control, power management, etc.) and facilitates communication between various hardware and software components.

Audio device 370 further includes microphone 374, speaker 372, and filters 375. Audio device 370 including speaker 372 and microphone 374 may operate as input and output transceiver for a speaker engaging in a phone call using wireless interface 364 and 390. Filters 375 may perform processing on input and output audio signals to improve data quality in AV data signals created by audio device 370.

Baseband device 359 may be implemented as a separate device or chip from processor 352 as shown in FIG. 3. In alternative embodiments, baseband device 359 may be implemented as an integrated device with processor 352, as firmware, or as software executed by processor 352. Baseband device 359 may operate in conjunction with audio device 370 to enable calls by managing audio-visual (AV) data from audio device 370 communicated to network 390 as part of a call. To implement relay, embodiments may function with baseband device 359 implementing a virtual audio device that enables applications to access audio functionality and mimic the input received from a microphone. This may enable communication of AV data received from network 390 to be treated as if it was received from audio device 370 as detailed further below.

Memory as described herein, including memory 304 and memory 354, may be any computer-readable medium and may further be any device or medium that can store code and/or data for use by one or more processors or device components. This may include a memory hierarchy, including cache, main memory and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs). Any such computer readable medium may reside on or within a single computer product (e.g. a hard drive, a CD, or an entire computer system), and may be present on or within different computer products within a system or network. In some embodiments, peripherals interfaces, one or more processors, and a memory controller can be implemented on a single chip within any device described herein. In some other embodiments, they can be implemented on separate chips.

Any device described herein such as host device 350 and client device 300 may also include a power systems for powering the various hardware components. Power systems can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, host devices and/or client devices may include various sensors. A camera may be one example of a sensor. Such camera devices along with other sensors may be considered input devices as part of input device 356. A camera may be used to create AV data for video calls. In some embodiments, devices may also include various other sensors. Sensors can include accelerometers, compass, gyrometer, pressure sensors, audio sensors, light sensors, barometers, microphones, and the like. Sensors can be used to implement various device decision making and filtering, such as blur compensation for a video image in a video call, or audio filtering to assist in filtering background noise from audio information captured at one or more microphones such as microphone 374.

In some embodiments, a client device 300 or a host device 350 can include a GPS receiver or other location assistance devices or modules. A device can use a satellite navigation system, such as the Global Positioning System (GPS), to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the mobile device. Based on these estimations, the mobile device can determine a location fix, altitude, and/or current speed. A location fix can be geographical coordinates such as latitudinal and longitudinal information. Other non-GPS location/motion modules may can assist in determining the current position (e.g., coordinates or other geographic location identifier) and motion of a client device 300 or host device 350. In addition to GPS, cellular network positioning based on "cell IDs," and WiFi positioning technology based on a WiFi networks may be used for location assistance. In some embodiments, location/motion modules may use sensor information with the above systems to determine the current position of the mobile device and to assist a user in finding the device.

Processor 302 and processor 352 may execute one or more applications on their respective devices, including without limitation, a browser, address book, contact list, email, instant messaging, word processing, keyboard emulation, widgets, JAVA-enabled applications, encryption, digital rights management, voice recognition, voice replication, a music player (which plays back recorded music stored in one or more files, such as MP3 or AAC files), etc. The one or more applications can also include a specific application for managing communications or for managing calls with relay functionality.

There may be other modules or sets of instructions such as a graphics module, a time module, etc. For example, the graphics module can include various conventional software components for rendering, animating and displaying graphical objects (including without limitation text, web pages, icons, digital images, animations and the like) on a display surface. In another example, a timer module can be a software timer. The timer module can also be implemented in hardware. The time module can maintain various timers for any number of events.

I/O subsystems including various input devices can be coupled to a display system such as display 308 or display 358. These displays may be touch-sensitive and may therefore operate as displays and input devices. A touch sensitive display of client device 300 may thus operate both as input device 306 and display 308. A touch sensitive display of host device 350 may operate as display 358 and input device 356. The display may present visual output to the user in as a graphic user interface (UI). The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, an I/O subsystem can include a display and user input devices such as a keyboard, mouse, and/or trackpad as part of input device(s) 306 or input device(s) 356. In some embodiments, I/O subsystem can include a touch-sensitive display. A touch-sensitive display can also accept input from the user based on haptic and/or tactile contact. In some embodiments, a touch-sensitive display forms a touch-sensitive surface that accepts user input. The touch-sensitive display/surface (along with any associated modules and/or sets of instructions) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, the input devices of a particular client device or host device can be coupled to one or more other physical control devices (not shown), such as pushbuttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, devices may include a touchpad separate from the screen for activating or deactivating particular functions. In some embodiments, the touchpad is a touch-sensitive area of the device that, unlike the touch screen, does not display visual output. The touchpad can be a touch-sensitive surface that is separate from the touch-sensitive display or an extension of the touch-sensitive surface formed by the touch-sensitive display.

In some embodiments, some or all of the operations described herein can be performed using an application executing on the user's mobile device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Computer programs incorporating various features of the present invention may be encoded on various computer readable storage media; suitable media include magnetic disk or tape, optical storage media such as compact disk (CD) or DVD (digital versatile disk), flash memory, and the like. Computer readable storage media encoded with the program code may be packaged with a compatible device or provided separately from other devices. In addition program code may be encoded and transmitted via wired optical, and/or wireless networks conforming to a variety of protocols, including the Internet, thereby allowing distribution, e.g., via Internet download.

In addition to client devices such as client devices 300 and 400A-Z, and host devices such as host devices 350 and 450 detailed above, aspects of networks such as network 390 and network connections such as network connections 338, 388, 418, and 488 may also be implemented using various devices and device components. For example, while in certain embodiments connection 338 may simply be a P2P wireless connection directly between wireless interface 312 and wireless interface 362, in other embodiments, a communications network such as comm. network 140 may be used to implement connection 338. Such a connection may include one or more access points, routers, server computers, storage devices, or other devices to implement network connection 338. Each of these devices may include a processor, memory, and input/output structure as detailed above. Similarly, other network connections may involve cell towers, switching networks, packet processing devices, in addition to the server computers and other network infrastructure detailed above, each of which may include processing, memory, and network interface components.

Although the invention has been described with respect to specific embodiments, it will be appreciated that the invention is intended to cover all modifications and equivalents within the scope of the following claims.

FIG. 4 includes client devices 400A-Z, host device 450, and network 490. Client devices 400A-Z may each be similar to client device 300, and network 490 may be similar to network 390 as described in detail above with respect to FIG. 3. Host device 450 host device 450 may be similar to host device 350. While host device 350 shows one embodiment of components that may make up a portion of a host device, host device 450 is shown as including elements that may be implemented in whole or in part as software, firmware, and/or hardware. For software or firmware embodiments, these elements may be implemented in whole or in part a processor and memory such as processor 352 and memory 354. These elements of FIG. 4 may also be implemented in conjunction with other hardware components shown in host device 350, or using other components or groups of components which are not specifically illustrated.

Host device 450 is shown as including user interface 451, relay application 452, IDS 453, signaling 454, A/V Conference 456, baseband I/O 474, baseband audio unit 472, audio unit 470, and wireless interfaces 462 and 464.

User interface 451 may refer to a display output, a set of options associated with user input actions, or a combination of display outputs and associated user input options. A user interface may thus be implemented using a combination of a display such as display 358, input device(s) such as input device 356, and associated logic and presentation as implemented using a processor and memory such as processor 352 and memory 354. For example, user interface 451 may comprise a display on a touch screen interface with an answer interface presented on the display including an answer button and a caller identification window. Other buttons may also be present including an ignore button and additional information related to the counterparty on the other side of the call. A relay button may also be present in such an interface to initiate a relay of the call to client devices 400A-Z.

User interface 451 may have multiple forms depending on a call state, such as an incoming call interface, a call answered interface, a call hold interface or other such state dependent forms. Each form may be associated with a different display that is output to the user, and which identifies different user selection options for each form of user interface 451. As a state of the device changes, either in response to a user selection at user interface 451, in response to an automatic change such as a call timeout, or in response to a counterparty communication received at a wireless interface, the form of the user interface 451 may change. For example, an incoming call interface may change to a call answered interface in response to receipt of an answer call input received at user interface 451. Alternatively, an incoming call interface may change to a default interface if a counterparty terminates the incoming call prior to any selection being made at user interface 451.

Relay application 452 may be any application that implements relay functionality as described herein. In certain embodiments, relay application 452 may essentially act as an interface for other applications operating on host device 450 to implement relay functionality in conjunction with other modules. In other embodiments, relay application may be any type of application integrated with relay functionality, including a call application, a game application, a multi-purpose communication application, or any other such application that may operate using a processor of host device 450. Relay application 452 may interact with identity services (IDS) 453, signaling 454, baseband audio unit 472, and user interface 451 to manage implementation of relay functionality. In other embodiments, relay application 452 may integrate functionality from other modules, or may communication with other modules any fashion to implement relay functionality as described herein.

IDS 453 may be a module that operates on host device 450 to implement identity services as part of relay functionality. This may be done in conjunction with additional IDS services such as identity management infrastructure 105 of FIG. 1 and IDS 205 of FIG. 2. In certain embodiments, IDS 453 may be considered an interface for interacting with an identity management server via a wireless interface. IDS 453 may include an address of an identity management server and an identity associated with host device 450.

As part of implementing relay functionality, IDS 453 may communicate with an identity management server to identify client devices 400A-Z as being associated with the same identity or a related identity that is also associated with host device 450. IDS 453 may also manage connections between host device 450 and client devices 400A-Z once the association of the devices with an identity group is confirmed. In certain embodiments, IDS 453 may store a host identifier for host device 450 that is received from an identity management server. IDS 453 may additionally store client identifiers for client devices that have been identified as part of an identity group or that shares an account identity. Each of these identifiers may be unique identifiers that allow the devices to distinguish one device from another during call relay operations.

Signaling 454 and AV conference 456 may each comprise, at least in part, communication ports opened by IDS 453 as part of communication and relay of signals between host device 450 and one or more of client devices 400A-Z. For example, if an input at user interface 451 causes relay application 452 to request communication with client devices sharing an identity with host device 450, IDS 453 may communicate with an identity management server to identity client devices 400A-Z as sharing an identity with host device 450. IDS 453 may then use the information from the identity management server to open a channel for use in overhead communication with each of client device 400A-Z as part of signaling 454.

Such a channel may use, in certain embodiments, TCP for communications and may involve opening an internet protocol (IP) socket for use in communications between client device 400A and host device 450. In other embodiments, any other such communications protocols may be used. Similarly, if relay of an audiovisual (AV) communication is initiated with a particular client device, IDS 453 may manage opening an IP socket that is particularly for the AV communication as part of AV conference 456. This may be a separate channel than the channel used by signaling 454, even though the communication is between the same devices.

In certain embodiments, as part of relaying a call, AV conference 456 may include adaptive channel management based on AV communication signal quality. For example, AV conference 456 may function as part of a system to identify dropped packets or channel degradation, and may adjust encoding or aspects of a signal to manage call performance during a relay process. As part of such adaptive channel management, AV conference 456 may work in conjunction with baseband I/O 474 to manage encoding of AV data for communication to client devices. Baseband I/O 474 may, in other embodiments, manage encoding of AV data from any source for communication to and from client devices and/or counterparties to a call across network 490.

Additionally, in certain embodiments, signaling 454 and/or AV conference 456 may work in conjunction with IDS 453 to assign various identifiers as part of call relay. For example, in certain embodiments, IDS may provide any client device or host device with a unique identifier to be used during a call. In additional embodiments, multiple connections may be opened between a single host device and a single client device, and IDS 453 operating as part of a larger identity services system may provide each connection with a unique identifier. Thus, if one IP socket is opened for signaling and control communications between a host and a first client device, and a second IP socket is opened for AV communications, each socket or a channel associated with each socket may be assigned a unique identifier by the IDS 453.

Audio unit 470 may be similar to audio unit 370, and may include microphone, speaker, filtering, and other AV communication components. In certain embodiments, this may include communications with a wireless headset or with a wired set of speakers. Other embodiments may include any such audio device components. Baseband input/output (I/O) 474 may refer to hardware, firmware, or software for managing AV communications as part of host device 450. In a cell phone communication between host device 450 and a counterparty phone via network 490, baseband I/O 474 may manage microphone input signals and speaker output signals from audio unit 470.

In addition to managing signals from an audio unit 470, baseband I/O 474 may also manage AV communication signals from baseband audio unit 472. Baseband audio unit 472 may operate, in certain embodiments, as a virtual audio unit which may provide various applications such as relay application 452 with access to baseband I/O 474. As part of relay functionality, this may enable AV communications from network 490 that would be sent to audio unit 470 for output via a speaker to instead be sent to baseband audio unit 472 for relay to another device via AV conference 456. AV conference may thus receive from a client device, an uplink conference audio stream, and input the uplink conference audio stream to the baseband I/O 474. Baseband I/O may output an uplink audio stream, and this stream may be communicated to the network 490 as the host device 450 receives a downlink stream of audio data from the network 490 as part of the call.

In certain embodiments, baseband audio unit 472 may be structured to receive the same signal that audio unit 470 would receive. Instead of outputting the signal on a microphone, however, baseband audio unit transfers the signal. This may be considered as providing a result similar to holding the output of a first phone speaker next to the input microphone of a second phone in order to relay a signal to a client device such as client device 400A. Baseband audio unit 472 may additionally receive AV communications from AV conference 456 and baseband I/O 474 via wireless interface 462 to relay the AV communication to a call counterparty using wireless interface 464 and network 490. Baseband audio unit 472 may thus, in certain embodiments, enable bypassing the audio unit 470 of host device 450 in order to relay AV communications between network 490 and a client device.

While FIG. 4 illustrates one embodiment of a system of modules and connections between modules, alternate embodiments may combine or enable communications between such modules in any possible way. For example, in certain embodiments, relay application 452 may encompass IDS 453 and baseband audio unit 472. In alternate embodiments, AV communications from wireless interface 464 may be communicated to relay application 452 by additional communications modules. In further embodiments, baseband I/O 474, baseband audio unit 472, and audio unit 470 may be combined or integrated in a variety of ways. In still further embodiments, multiple applications in addition to relay application 452 may access baseband audio unit 472 to enable the applications access to a virtual audio unit and associated functionality.

III. Relaying a Call to a Client

A. Sequence Diagram

Figure 5:
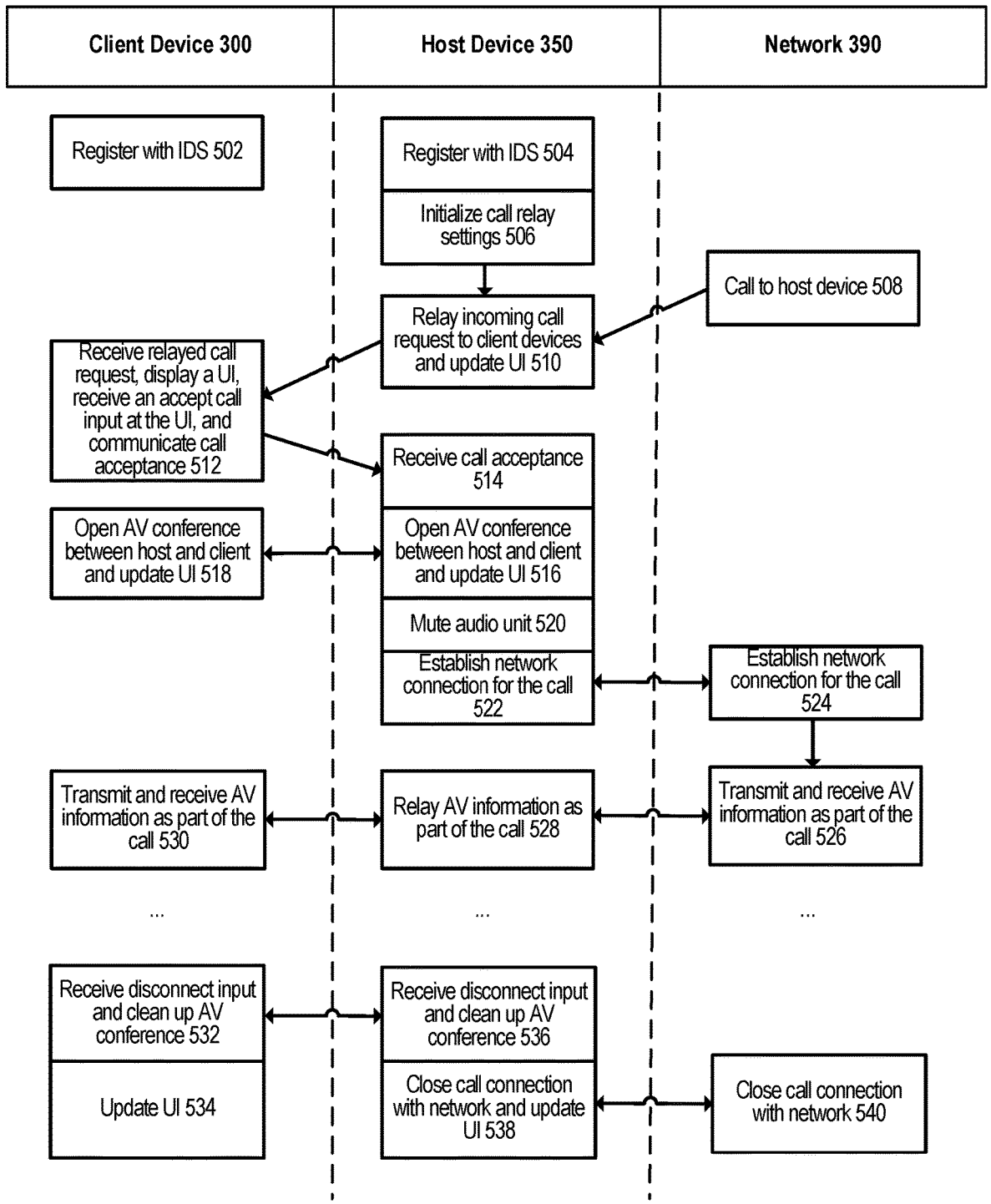
FIG. 5 illustrates a signal flow for a remotely initiated call according to various embodiments.

FIG. 5 describes one method of making a call using relay. The chart of FIG. 5 is illustrated as using a first client device 300, a host device 350, and a network 390 from FIG. 3. In alternate embodiments, any client device, host device, and network may be used. The chart of FIG. 5 additionally shows one potential sequence, with the sequence progressing from top to bottom. Alternative embodiments may be implemented with the order altered in any way possible given the specific dependencies of signals and inputs.

In initial blocks 502 and 504 include device registration with an identity service. This enables client device 300 and host device 350 to be associated as part of an identity or a group of identities. This also enables each device to be given a unique identifier by an identity management system, so that each particular device may be easily identified during relay communications.

As another initial block, 506 includes receipt of call relay settings at host device 350. This may include a selection for call relay to be used for all incoming calls, particular groups of incoming calls, calls during certain times or trigger periods, or any other such settings. Block 506 may also include settings for which client devices are to receive relay messages. This may include any combination of selections for particular client devices that are associated with an identity or account shared by host device 350.

In block 508, network 390 carries a call from a counterparty, and communicates the call to host device 350. In block 510, host device 350 receives the incoming call request, and based on the settings from block 506, relays notice of the call to one or more client devices. This relay communication may include an incoming phone number, a host device ID, a user identity or account identity associated with both the client device and the host device, and other IDs associated with the communication such as a video ID or other metadata associated with the call. This relay process may be similar to the process described for FIG. 4, where an IDS module of host device 350 accesses an IDS server to identify a plurality of clients including client device 300. The host device 350 may then communicate notice of the incoming call to all of the associated client devices. As part of a response to receipt of the incoming call, host device 350 may also update a user interface to indicate that a call is incoming, and that notice has been relayed to the client device or devices. In certain embodiments, relay of the incoming call request may use a signaling module such as signaling 454 of FIG. 4.

In block 512, client device 300 receives notice of the call by a relayed call request. Client device 300 may then display a user interface indicating that a call is incoming at host device 350. When an input is received via the user interface to accept the call, a call acceptance may be sent to host device 350. Such a call acceptance may include a unique identifier assigned by an identity services system as discussed above. It may also include the user identity associated with both the host device and the client device, a start time, any number of system state flags, and any other such metadata. In certain embodiments, a user interface may be updated upon receipt of the accept call input, while in other embodiments, the user interface update may wait for connection of the call, or the user interface may be updated multiple times at client device 300 through this part of the process.

In block 514, host device 350 receives notice that an accept call input was received at client device 300. If multiple client devices were informed of the incoming call, host device 350 may then communicate an update to the informed client devices other than client device 300 that the call has been accepted. Host device 350 may also implement processes to manage conflicting call accept inputs from multiple devices.

In blocks 516 and 518, an AV conference is opened to enable relay of AV communications from host device 350 to client device 300. In block 520, an audio unit of host device 350 is muted, and in blocks 522 and 524, a network connection for the incoming call is completed. This process may, in certain embodiments, be the same process for connecting a call to enable a user of host device 350 to speak as part of the call. The audio unit 520 is muted during this process because, although the call is connected, the relay is taking the place of the audio unit functionality due to the relay process. Relay operation without muting audio unit 520 may, in some embodiments, result in automatic engagement of a speaker and microphone at host device 350 which may interfere with an end to end call between client device 300 and network 390 created by relay of the call from host device 350 to client device 300.

This end to end call is established at blocks 526, 528, and 530 based on the processes above. As part of these blocks, AV communications are sent and received from a call counterparty over network 390. Similarly, client device 300 sends and receives AV information as part of the AV communication. Host device 350 relays the information between client 300 and network 390 as part of block 528. This call relay continues until a disconnect input is received at block 532 or 536. Such a disconnect input may be received in a variety of ways.

In certain embodiments, the call may continue after the relay is disconnected if an input to discontinue the relay is received via a user interface of either client device 300 or host device 350. Following such an input, the call may continue between host device 350 and network 390. A disconnect input may also be received via a user interface of either client device 300 or host device 350. In either case, an AV conference using a connection between client device 300 and host device 350 will be cleaned up after termination of the relay, and in block 534, a user interface of the client device 300 will return to a default state. Similarly, after the call is disconnected in blocks 538 and 540, any actions taken in connection with the call may be cleaned up at host device 350, and a host device user interface may return to a default state.

B. Host Device

Figure 6:
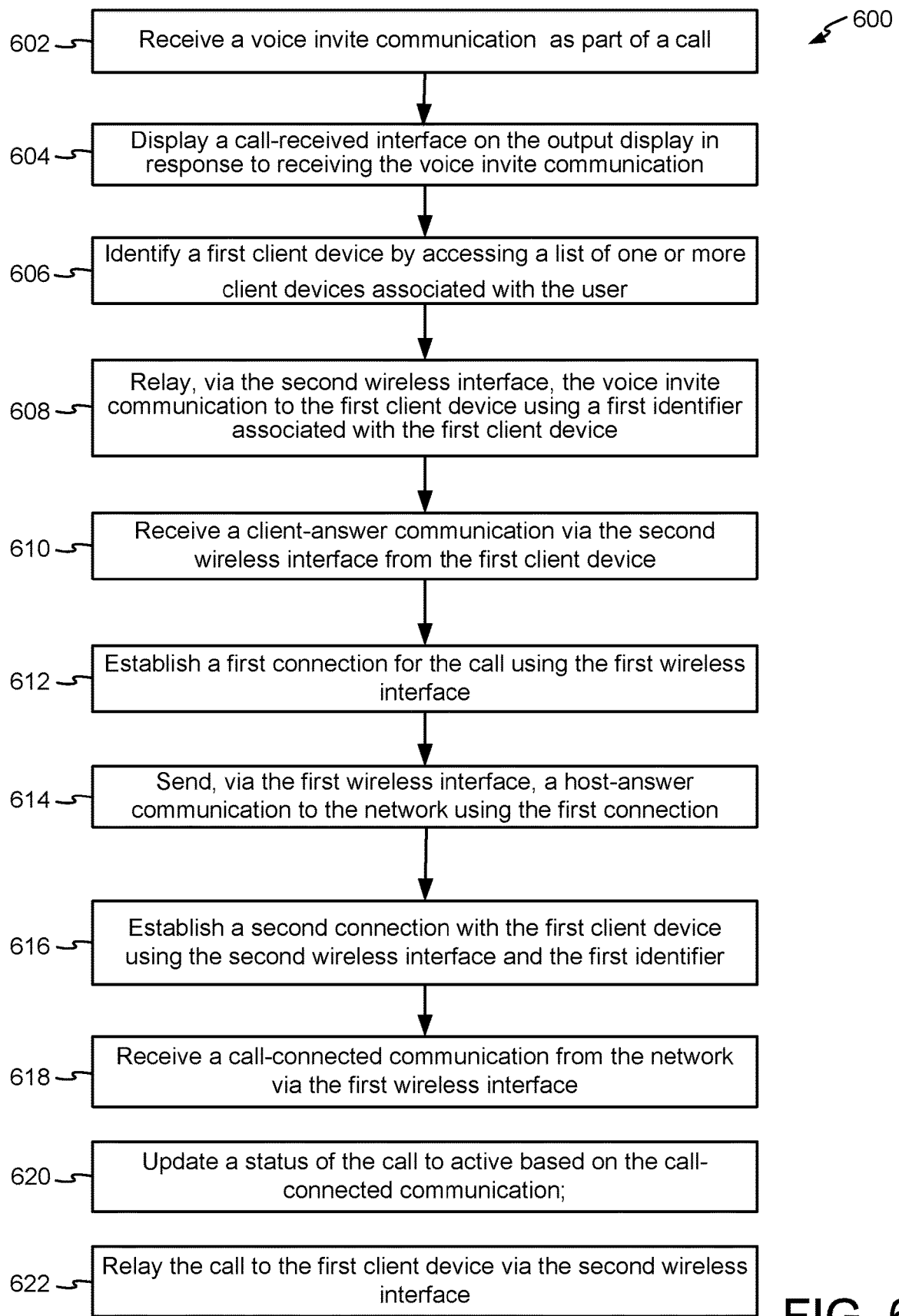
FIG. 6 describes a method of relaying a call between a client device and a host device according to embodiments of the present invention.

FIG. 6 describes a method 600 of relaying a call between a client device and a host device according to embodiments of the present invention. FIG. 6 describes a method performed at a host device. The host device may be similar to host device 350, host device 450, or any other such host device. As indicated, in embodiment of FIG. 6 involves a host device with a first wireless interface for communicating to a first network, a second wireless interface for communicating to the first client device, a memory, a display, and a processor coupled to the first and second wireless interfaces, to the memory, and to the output display (e.g., a touch screen display).

At block 602, the first wireless interface of the host device receives a voice invite communication from a first network as part of the call. The voice invite communication may be for an audio call, a video communication, or a call including both audio and video. As used herein, AV communication, voice communication, or call refers to a communication that may include either audio or video only, or both. Examples of the first wireless interface include radio network interfaces, such as 3G, 4G, and LTE. A voice invite communication is a signal notifying the host device that there is an incoming call. Such a communication can be when a phone receives a phone call from another phone via a radio network. The voice invite communication may additionally include metadata such as an identifier associated with a device or counterparty that initiated the call.

At block 604, the output display of the host device displays a call-received interface on the output display in response to receiving the voice invite communication. Such an interface may include call details, display of information associated with physical buttons, or creation of virtual buttons on a touchscreen. Call details can include caller ID information, which may include a name from a contact list. Examples of such an interface can include one or more of the following buttons: an answer button, a hold button, a forward button, and a decline button.

At block 606, a first client device is identified by accessing a list of one or more client devices associated with the user. The list includes a device identifier for each client device. The host device can store the list in the memory of the host device, e.g., in flash memory or RAM. The host device can retrieve the list from a server, and then temporarily store the list in memory. Thus, this list may be accessed by communicating with an identity management server after receiving the voice invite communication.

The client device identifiers can be used to ensure that the client device is an approved device, which may be determined when the voice invite communication is sent. The client identifier may also be used to identify the communication as being part of the first connection, so the host device knows how to process the communication, e.g., how to respond to the first network.

More client devices than the first client can be identified. Similar procedures can be performed for the other client devices. For example, at least some of steps 608-622 can be performed in parallel for multiple client devices. Depending on which client device responds to with an answer communication, the call can be forwarded to that client device.

At block 608, the second wireless interface of the host device relays the voice invite communication to the first client device using a first identifier associated with the first client device. As recited here, relaying the voice invite communication may include sending a copy or part of a copy of a communication received at the host device. This may also include creating a new notice in response to receipt of the voice invite communication, and sending the notice. Either wireless interface device may be configured to communicate any time of wireless signal described herein.

Additionally, in certain embodiments, the first wireless interface and the second wireless interface may be different physical devices for different wireless communication types. For example, the first wireless interface may include a wide area network antenna, and the second wireless interface may include a local area network or near field antenna. In other embodiments, the first wireless interface may be the same interface as the second wireless interface. The voice invite communication may include the same information as was sent by the first network or can have a different form that includes more or less information that was sent by the first network.

At block 610, the second wireless interface receives a client-answer communication from the first client device. In alternate embodiments, the client-answer communication may be received via a different interface other than the interface that was used to communicate the voice invite communication. The client-answer communication can be any signal that indicates that the user has accepted the call on the first client device.

If the second wireless interface receives multiple client-answer communications from different client devices, then the host device can select one of the client devices based on one or more criteria. For example, a priority list can be set by the user at the host device for a preferred order of client device, where the client device with the highest priority that provides an answer can be selected. A particular phone may have highest priority, e.g., when that phone is a default for making video calls (e.g., a default set by the user). In one embodiment, only the top host device is provided to the user. In such a case, the user effectively selects the phone by requesting a call to be made.

At block 612, the host device establishes a first connection for the call using the first wireless interface. The first connection can be a same connection as used in block 602 for receiving the voice invite communication. The first connection can also be a different connection than used in block 602. In one implementation, the first connection can proceed as if a user had answered the call on the host device.

At block 614, the first wireless interface sends a host-answer communication to the network using the first connection. Block 614 may involve, in part, receiving, from the network via the first wireless interface, a call-connected communication. This may involve multiple rounds of communication and acknowledgement transmissions as part of a handshaking process to establish the connection. The first connection may then provide communication of voice data and/or video data and possibly other metadata between the host device and the network. The host-answer communication can be any of the signals from the host device that indicates an answer of the call to the first network.

At block 616, the host device establishes a second connection with the first client device using the second wireless interface and the first identifier. The second connection provides communication of voice and/or video data between the first client device and the host device in response to the client answer communication. The second connection can be the same or a different connection as used to convey the client-answer communication. The first identifier can be used to ensure that the second connection is made to the client device that answered the invite communication.

At block 618, the host device receives a call-connected communication from the network via the first wireless interface. The call-connected communication can occur before or after the establishing of the second connection with the first client device.

At block 620, the host device updates a status of the call to active based on the call-connected communication. A call status can be maintained in working memory, e.g., so the host device can continue to forward data between the first client device and the first network.

At block 622, the second wireless interface relays the call to the first client device. The host device may then continue relaying the AV information until either the relay is terminated and the host device is made an endpoint of the call, or until the call is terminated and the connections associated with the call are closed and cleaned-up.

C. Client Device

Figure 7:
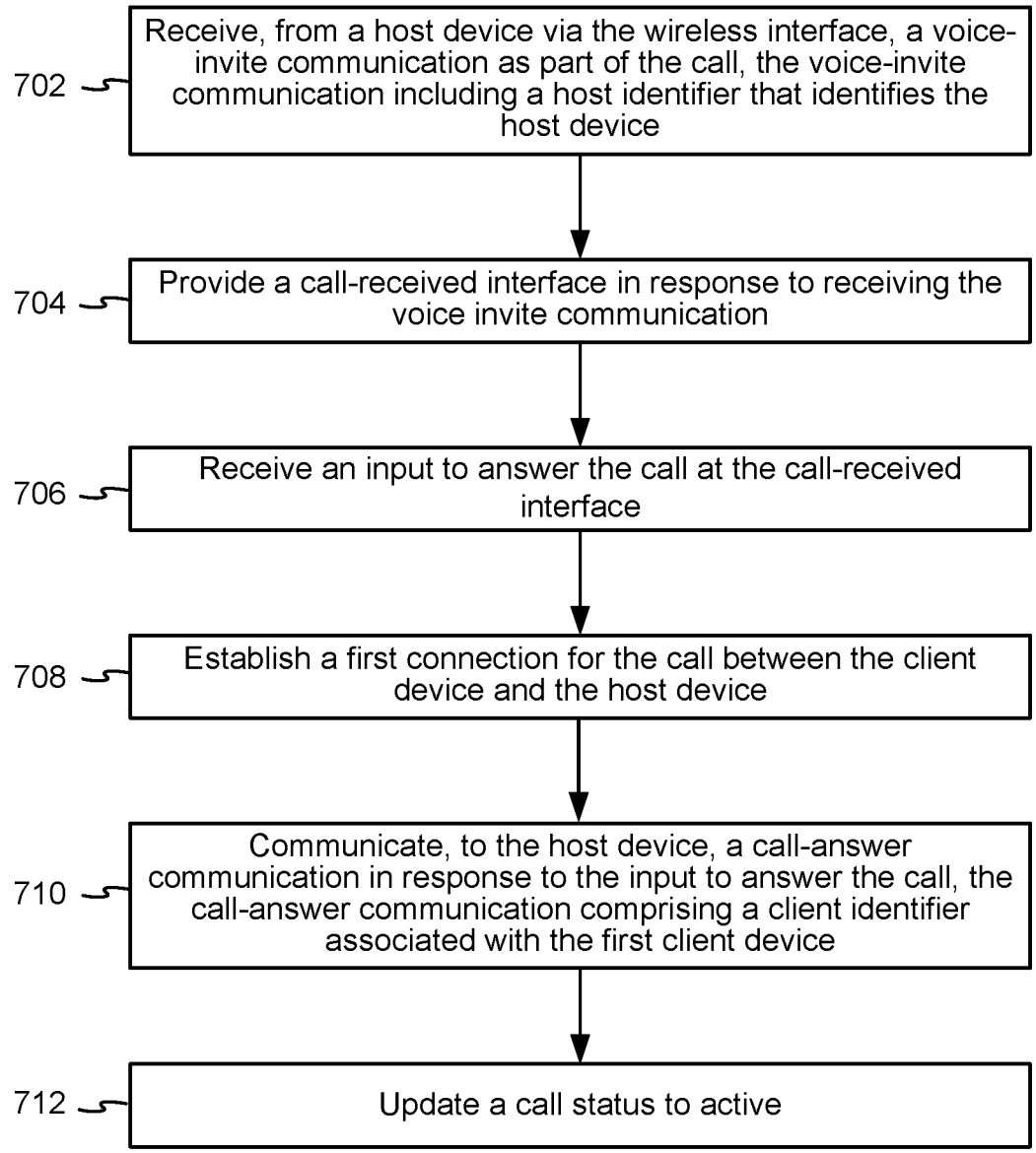
FIG. 7 describes a method performed by a client device that acts as the end point of a communication being relayed by an associated host device according to embodiments of the present invention.

FIG. 7 describes a method 700 related to method 600, but correspondingly performed by a client device which acts as the end point of a communication being relayed by an associated host device. The first client device performing the method of FIG. 7 may be any client device described herein, and includes a wireless interface, an output display, and a processor coupled to the wireless interface and the output display.

At block 702, a first client device receives, from a host device via the wireless interface of the client device, a voice-invite communication as part of the call. The voice-invite communication includes a host identifier that identifies the host device. Examples of the voice-invite communication are provided above. The first client device can use the host identifier for establishing a connection with the host device should the call be answered at the first client device. In another example, the first client device can use the host identifier to ensure that the host device is associated with the same user as the first client device. For example, the first client device can check the host identifier against a list of known devices of the user, where the list can be stored at the client device or accessed by the first client device from a server (e.g., a server of identity management infrastructure 105). The host identifier can be used to facilitate any communications between the first client device and the host device.

At block 704, a call-received interface can be provided by the first client device in response to receiving the voice invite communication. The call-received interface may be visual by display on the output display or by voice, e.g., a voice command interface. Such an interface may include call details, display of information associated with physical buttons, or creation of virtual buttons on a touchscreen. Call details can include caller ID information, which may include a name from a contact list. Examples of such an interface can include one or more of the following buttons: an answer button, a hold button, and a decline button. An audible ring can be output in response to the receiving the voice invite communication.

At block 706, the call-received interface receives an input to answer the call. The input may be provided via the output display (e.g., via a touch selection of a button) or via voice command. For example, a user can select an answer button on the output display, or the user can say "answer" when prompted by the call-received interface.

At block 708, the first client device establishes a first connection for the call. The first connection provides communication of audio between the client device and the host device. This connection may, for example be performed using the wireless interface and an AV conference implemented partially on the host device and partially on the client device via the channel and wireless interfaces coupling the devices. The first connection can be a same connection used to receive the voice-invite communication. In another embodiment, the first connection can be newly generated and be separate from a connection used to receive the voice-invite communication.

At block 710, the first client device communicates a call-answer communication to the host device in response to the input to answer the call. The call-answer communication can comprise a client identifier associated with the first client device. The host device can use the client identifier, e.g., so to determine which client device to forward the call. Such a determination by the host device can include a priority list, as described above. The client identifier can also be used to ensure that the client device is an approved device, which may be determined when the voice invite communication is sent. The client identifier may also be used to identify the communication as being part of the first connection, so the host device knows how to process the communication, e.g., how to respond to the first network.

At block 712, a call status is updated to active. For example, the first client device can store a call status in working memory to identify whether to continue with the first connection to exchange data with the host device. Following this, the first client may act as an endpoint of the call, receiving AV information from a counterparty to the call via a network and the host device and communicating AV information back along the same path until the relay is terminated.

At a later time, the user can select to end the call at the first client device. Such an input can be received at an end call button on the output display. The first client device can send the end response to the host device so that the host device can close the connection to the network. The first client device can close the first connection with the host device in response to the end input.

IV. Initiating a Call at a Client

A. Sequence Diagram

Figure 8:
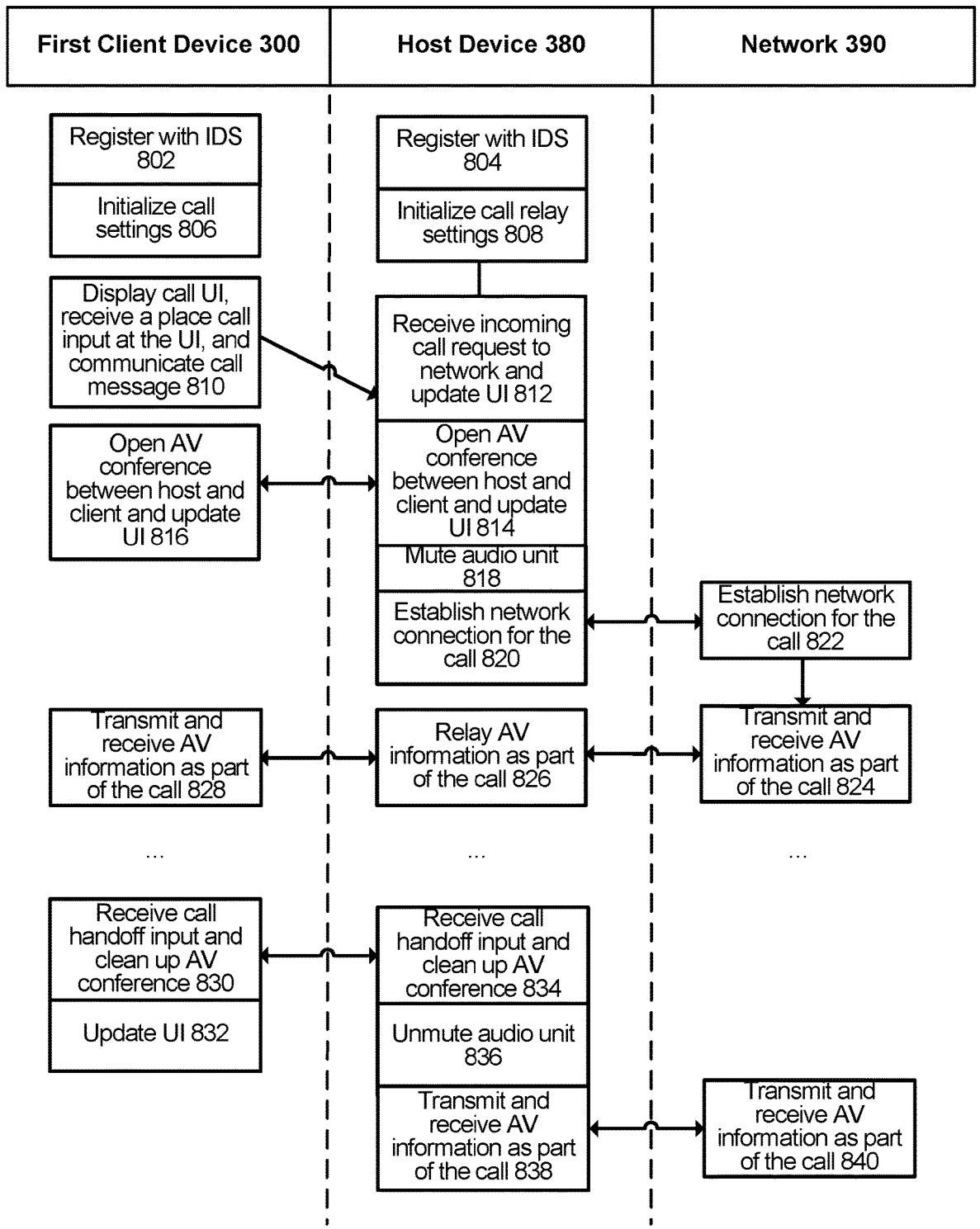
FIG. 8 describes a method where a call may be initiated by a client device of a user to be made via a host device of the user according to embodiments of the present invention.

FIG. 8 describes a method where a call may be initiated by a client device of a user to be made via a host device of the user according to embodiments of the present invention. Further, a handoff (transfer) may be performed to move an endpoint of a call from the initiating client device to the relay host device. As mentioned above, such a relay may also be performed when a host device is receiving an incoming call from a counterparty as described in FIG. 5.

In blocks 802 and 804, first client device 300 and host device 380 may register with an identity management system. This may provide the devices with unique identifiers and associate the devices with an identity or account. As part of such a registration and association, the devices may store unique identifiers for devices sharing an identity locally, which enables the host device to locate client devices without the need to access an IDS server prior to initiating a relay. In various embodiments, registration may be renewed or updated periodically or based on various triggers such as system updates or alerts pushed from the identity system.

In block 806, call settings may be initialized. For example, if an identity or account is associated with multiple host devices, the settings may identify which host devices may be used with the first client device 300, or a priority list for which host devices the first client device 300 should attempt to use first to initiate a call relay. In block 808, call relay settings may be set at host device 380. This may include settings allowing outgoing calls from particular client devices. This may also include timeout settings, which may disconnect a relay after a connection to a first client device 300 or network 390 is silent for a period of time determined by the call relay settings.

In block 810, a default user interface is initially displayed with an initiate call input option. A place call input is received at the user interface, and a communicate call message is sent from first client device 300 to host device 380. In block 812, host device 380 receives the call request from the first client device 300, and updates a user interface. In Blocks 814 and 816, an AV conference is opened with a channel for the relay portion of the call. In block 818, the audio unit of host device 380 is muted, and in blocks 820 and 822, the network connection for the call is established. In various embodiments, communications as part of establishing a connection for the call such as a ring tone or a busy signal may be relayed back to first client device 300 so that sound associated with these communications may be played at first client device 300. While the opening of the AV conference and muting of the audio is shown prior to establishing the network connection to network 390 for the call, in certain embodiments, the AV conference may be established after the call is connected.

In blocks 824, 826, and 828, AV information as part of the call is relayed between network 390 and first client device 300 as part of the call. Following this, as shown by blocks 830 through 840, the endpoint of the call may be transferred from the first client device to the host device. In block 830, a call handoff input (transfer request) is received at first client device 300. The AV conference is then closed in blocks 830 and 834, and the user interface at the first client device is updated at block 832.

In block 836, the audio unit is unmuted, and the host device becomes an endpoint of the call. In certain embodiments, this unmuting process may be performed in a variety of different ways. For example, referring to FIG. 4, during call relay, AV information coming from the network 390 may be sent to baseband audio unit 472 (either directly, via relay application 452, or via some other path), then to baseband I/O 474, then to AV conference 456 where it is transmitted to a client device via wireless interface 462. AV information coming from the client device may follow the reverse path to network 390. Audio unit 470 is not part of the communication and may be blocked.

When a handoff (transfer) input is received, either at the client device or the host device involved with the relay, the AV information from network 390 is redirected to the audio unit 470, and creates an AV output at a microphone and possibly a display associated with audio unit 470. In certain embodiments, this will bypass baseband audio unit 472, and send the AV information to audio unit 470 via baseband I/O 474. Similarly, AV input from a microphone and/or camera associated with audio unit 470 may then be sent to network 490 via baseband I/O 474, bypassing baseband audio unit 472.

In various other alternative embodiments, any such changes in module connections may be made to transfer the AV information from a relay mode that passes the AV information received at a host device between a client and a network, to a local mode where the host device is an endpoint that outputs AV information at an audio unit and/or a display and that captures AV information via a microphone and/or a camera to pass to a call counterparty via a network.

In blocks 836 and 840, AV information is communicated between the host device and the network as part of the call until the call is terminated or transferred from the host to a client device, which may be either the first client device or another client device, is performed.

B. Client Device

Figure 9:
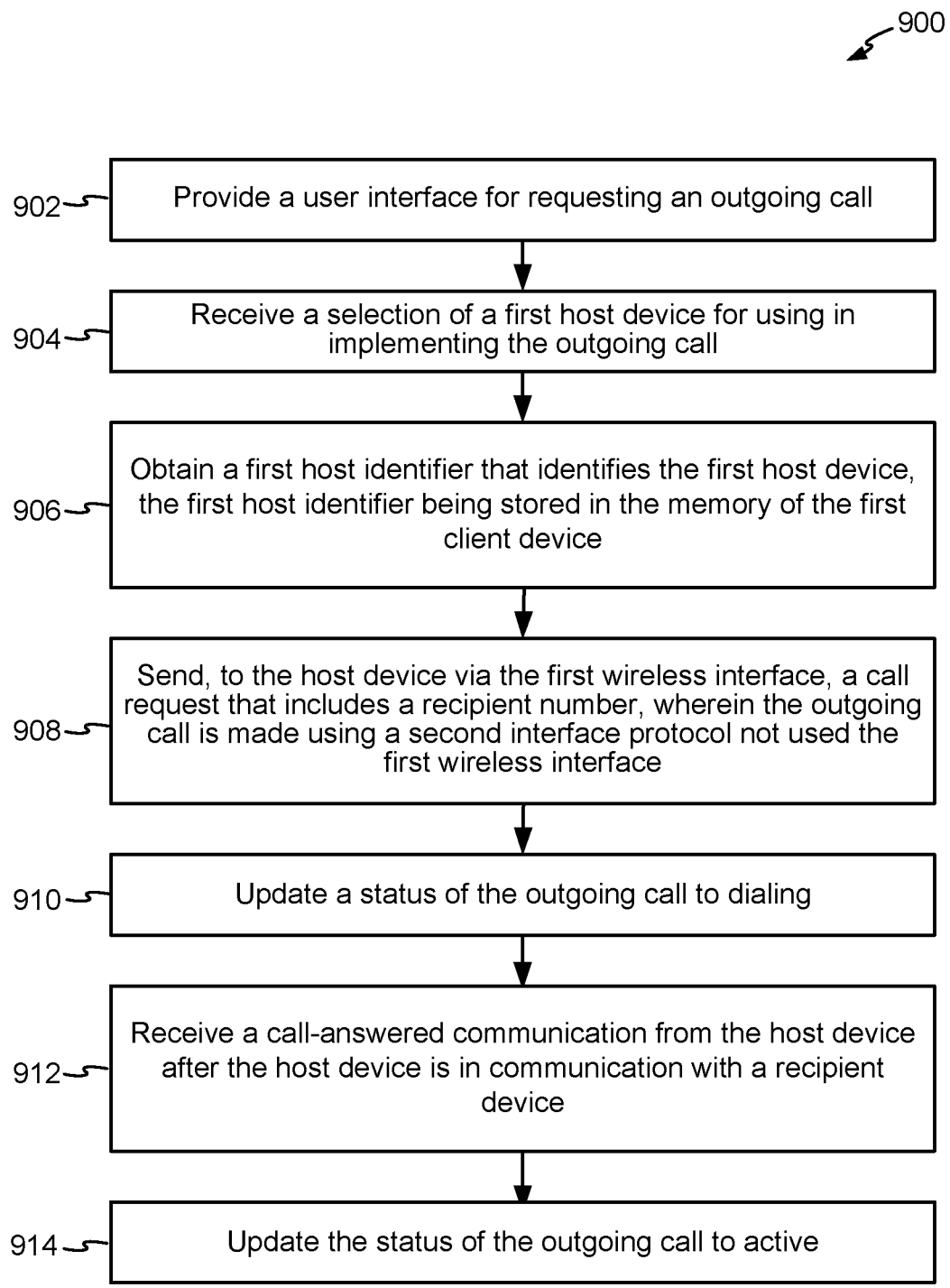
FIG. 9 describes a method for initiating a relayed call using a client device according to embodiments of the present invention.

FIG. 9 describes a method 900 for initiating a relayed call using a client device according to embodiments of the present invention. The method of FIG. 9 may, in certain embodiments, be performed by a client device that includes a first wireless interface, an output display, and a processor coupled to the wireless interface and the output display.

At block 902, the client device provides a user interface for requesting an outgoing call at the client device. As part of this provision, the client device may initially communicate with an identity service, and receive contact details for one or more host devices. The device may also send an initial query to the host to insure that the host is powered on, connected through an acceptable network, and available for a call. If the host device is powered off, inaccessible via a wireless connection, or already engaged in a call, the user interface may display this information. The client device may periodically poll the host device for a status update to see if it is available for call relay, and may update the user interface when the host device becomes available.

At block 904, a selection of a first host device is received by the user interface of the client device. The selection identifies the first host device for use in implementing the outgoing call. The selection can be provided in various ways. For example, the client device can provide a list of possible host devices to use. The list can be determined from user input of known devices of the user or previous communications. The current list provided to the user can be dynamically confirmed before providing to the user, e.g., the client device can attempt to communicate with the host devices.

Host device(s) to which a connection could not be made may not be provided to the user to select, as such host device(s) can be considered as not available. Further, the host devices can be presented in a ranked order according to criteria. Example criteria for the order can be speed of connection from the host device to a network for making the call, current connection status of the host device to the network, battery status of the host device, and current battery usage. The order may also be set by the user. If no host devices are available, an error signal can be sent to the user, informing the user that initiating a call via a host device of the user is not available. The error signal can be provided before providing a list of host devices, or after providing a list (e.g., when the host devices are not confirmed before providing the list).

At block 906, a first host identifier that identifies the first host device is obtained. In one embodiment, the first host identifier is stored in the memory of the client device. The memory may be part of an IDS application or service operating on the client device, or may be stored as party of a relay application or any other application, module, or program used to implement the call relay. In another embodiment, the first host identifier may be obtained from a server. The host identifier can be used in later steps of method 900.

At block 908, the client device sends a call request that includes a recipient number to the host device via the first wireless interface of the client device. The call request requests that the host device initiate an outgoing call to the recipient number. The outgoing call is made using a second interface protocol that is different than one or more first wireless interface protocols of the first wireless interface. In one embodiment, the client device can use the host identifier to establish a connection between the client device and the host device. The call request can be sent over the connection, the connection having a connection identifier.

The recipient number may be provided via any suitable user interface. For example, the user can type a 10 digit phone number, or any international phone number. The recipient number can also be any suitable identifier, e.g., an e-mail or instant messaging address that can accept a call.

At block 910, the user interface may update a status of the outgoing call to dialing. The status of dialing may be provided in various ways, which can show progress or an action being taken. A current status can be stored in working memory of the client device.

At block 912, the client device may then receive a call-answered communication from the host device after the host device is in communication with a recipient device. The recipient device corresponds to the recipient number. The client device may then use an AV conference connection to send and receive AV information until the relay or the call is terminated. The AV conference connection can be a persistent connection between the client device and the host device for sending data for the call. The data can be audio and/or video data.

In one embodiment, the call-answered communication can includes the host identifier. The host identifier can be used to associate the call answered communication with the outgoing call. In this manner, the client device can know that the call-answered communication pertains to the status of the outgoing call.

At block 914, the status of the outgoing call is updated to active. The active status can indicate to the client device that data for the phone call should be continued to be routed to the host device for sending to the recipient device. At a later time, the user can provide an end request to end the call. At that time, the end request can be sent to the host device to end the call. And, the connection between the client device and the host device can be closed.

In one embodiment, as part of ongoing communication with the host device for the call, the client device can receive call data messages from the host device. The call data messages can include a connection identifier and call data. The call data can be from the network and the connection identifier can correspond to the connection between the client device and the host device. Using the connection identifier, the call data can be routed to a speaker or display of the client device. The connection identifier can include or be based on the host identifier, e.g., along with an identification that the connection is for a call. Since only one call would typically occur between the client device and the host device, the host identifier and a flag for a connection type can uniquely identify the connection.

C. Host Device

Figure 10:
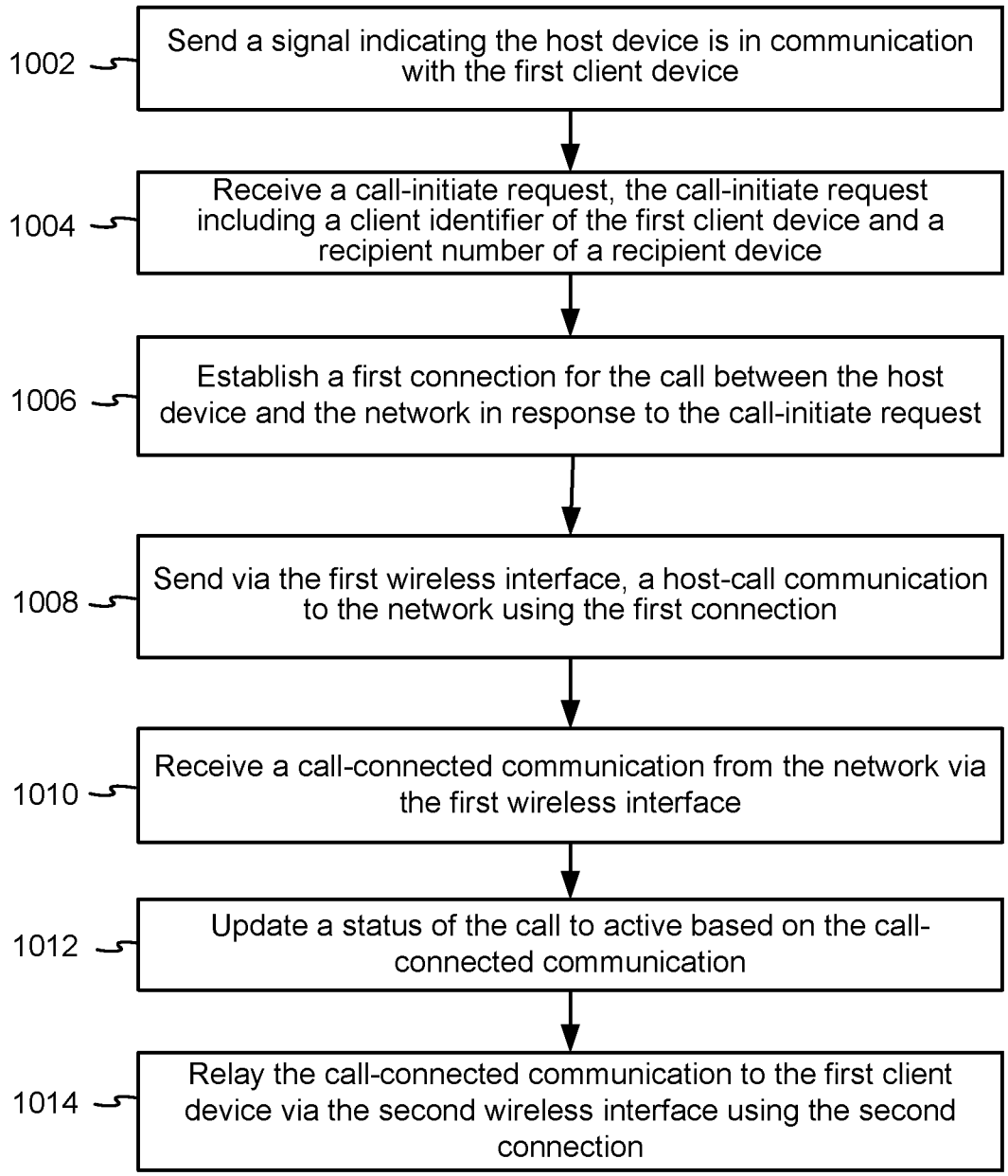
FIG. 10 describes a method for relaying, by a host, a call initiated by a client device according to embodiments of the present invention.

FIG. 10 describes a method 1000 for relaying, by a host, a call initiated by a client device according to embodiments of the present invention. In one embodiment of FIG. 10, the host device implementing the method may be made up of at least a first wireless interface for communicating to a first network, a second wireless interface for communicating to the first client device, a memory, an output display, and a processor coupled to the first and second wireless interfaces, to the memory, and to the output display.

At block 1002, the host device sends a signal to the client device indicating the host device is in communication with the client device. For example, the signal can be in response to the client device confirming which host devices are available, which can occur before providing a list of host devices to the user. The signal can also include information about network connectivity of the host device, e.g., whether the host device has a sufficient signal for making an outgoing call.

At block 1004, a call-initiate request is received at the host device. The call-initiate request can include a client identifier of the first client device and a recipient number of a recipient device. The client identifier can uniquely identify the client device, e.g., among other client devices of the user. The recipient number can be received in any suitable form, e.g., as mentioned herein.

At block 1006, the host device establishes a first connection for the call in response to the call-initiate request. The first connection provides communication between the host device and the network. The first connection can be created in a similar manner as if the user had initiated the call at the host device, e.g., by dialing the recipient number at a user interface of the host device. A second connection between the first client device and the host device via the second wireless interface using the client identifier may also be established.

At block 1008, the first wireless interface sends a host-call communication to the network using the first connection. The host-call communication can be implemented as a normal call by the host device would occur. The host device can track the call (e.g., with a call identifier) so that the host device knows to relay the call to the client device.

At block 1010, the first wireless interface receives a call-connected communication from the network. The call-connected communication can signal to the host device that data for the call can be communicated between the host device and the network. The host device can save connection information related to the first connection in preparation for a connection to the client device, and relaying data between the client device and the network.

At block 1012, the host device can update a status of the call to active based on the call-connected communication. In addition to updating the status of the call, the host device can institute routing rules for data received for the first connection. The first connection can be a connection identifier associated with it. Data received from the network can include the connection identifier, thereby informing the host device that the data is associated with the call.

At block 1014, the host device can relay the call-connected communication to the first client device via the second wireless interface using the second connection. In one embodiment, the host device can receive an acknowledgement from the client device as to receiving the call-connected communication, and that the client device is ready to send and receive data for the call.

The host device may then continue operating to relay call information between the client device and the network until the relay operation is ended. The data can be relayed using an association between the first connection and the second connection. For example, data received over the second connection can have a second connection identifier identifying the second connection. The client identifier could function at least in part to provide the second connection identifier. The host device can then use routing rules to identify the first connection as being associated with the data, and then forward the data to the network. Data received from the network can be routed to the client device in a similar manner.

V. Protocol Stack

Figure 11:
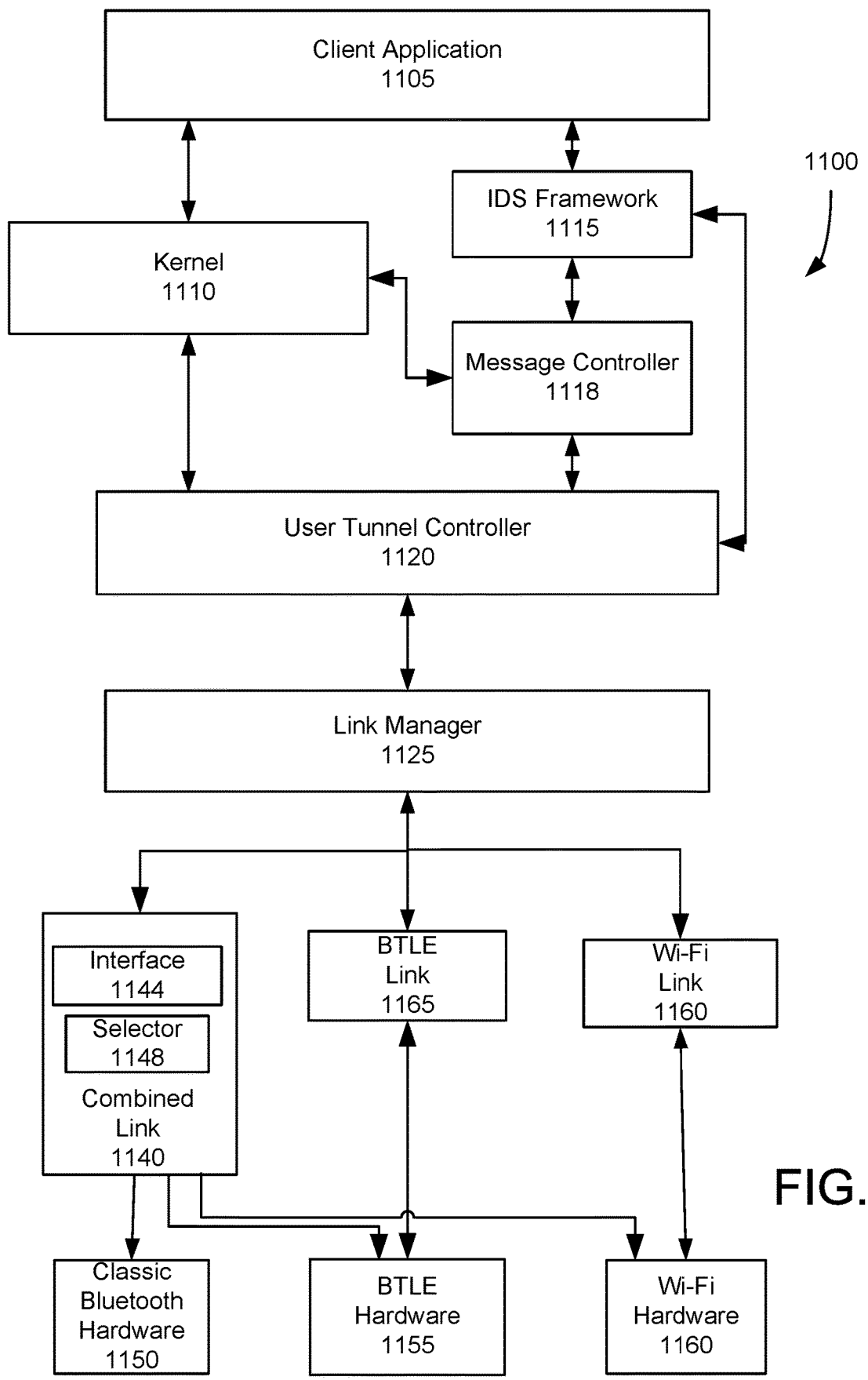
FIG. 11 shows a protocol stack 1100 for communicating data according to embodiments of the present invention.

FIG. 11 shows a protocol stack 1100 for communicating data according to embodiments of the present invention. In various embodiments, the protocol stack 800 may be implemented as part of any host or client device described herein, or as part of any other device that may be used with various embodiments. In certain embodiments, the protocol stack 1100 may be used to manage retransmission priority either in whole or in part. Various modules in protocol stack 1100 can be omitted, or other modules added. The software modules can be run on a same processor or different processors. Although only a few communication protocols are listed, numerous wireless protocols can be used. For example, Bluetooth protocols can include Basic Rate (BR), Enhanced Data Rate (EDR), and Low Energy (LE) options. Bluetooth BR/EDR is also referred to as Classic Bluetooth.

The communication of data from a device (e.g., mobile device 115, companion device 120, first device 300, or second device 350) can occur through various protocols (e.g., 802.11 protocols, Bluetooth protocols, and near field communication (NFC) protocols). To determine which protocol to use, a device can include a link manager for determining which protocol to use for a particular application, and thus which driver path data should be sent. A lower level link layer can also perform selections of a particular protocol to use. Further, a user tunnel (UTUN) controller can coordinate a plurality of virtual connections with various client applications to communicate over a common socket connection with another device (e.g., mobile device 115 communicating with companion device 120).

In some embodiments, a client application 1105 on the device (e.g., mobile device 115) can request data to be sent to another device (e.g., companion device 120). The request can specify the other device via any suitable identifier, e.g., an account name, an IP address, a MAC address, etc. The request can be before or after the device determines that the other device is within communication, e.g., as determined by initial signaling, such as a handshake. The data (e.g., in a message or a stream) can be sent any suitable application layer protocol, such as HTTP, RTP, SMTP, MGCP, etc. The other device can be any device, including another device of the user. The request can made be in response to an action by the user, an internal event (e.g., based on time or other criteria) that may be in a same or other application (e.g., a calendar app), or an external event (e.g., in response to a message from another device). An example of an event is a syncing event.

Before sending data, client application 1105 can submit an open socket request (e.g., in a streaming example). The socket request can use information from an identity services (IDS) framework 1115, which can provide an address (or other type of ID) for the other device. For example, client application 1105 can know account information for the second device (e.g., account information of a different or same user), and IDS framework 1115 can store a list of device IDs for a particular account. IDS framework 1115 can be in communication with identity management infrastructure 105 to obtain the list. Thus, IDS framework 1115 can store or otherwise obtain device IDs (e.g., addresses) for all devices that a user has registered with ID infrastructure 105. For example, IDS framework 1115 can request via an IDS daemon to ID infrastructure 105 to obtain the device IDs. In one implementation, the socket request can be made to kernel 1110.

In a messaging example, the request to send data can go to IDS framework 1115 to obtain a device ID, which can be sent to message a message controller 1118 and a user tunnel (UTUN controller 1120. UTUN controller can establish a mapping between the device ID and an IP address (e.g., a virtual IP address) when the device ID is not an IP address. A socket can be created between message controller 1118 (which assigns a device ID to the socket) and kernel 1110 (which can assigns an address to the socket, such as a virtual IP address). UTUN controller can be used to create the socket connection between message controller 1118 and kernel 1110. In this manner, the send-date request from client application 1105 does not need to include a device ID, but can specify an account, which can then be cross-referenced by IDS framework 1115 with known devices of the account and their capabilities (e.g., if the request requires certain capabilities). Given that a device ID can be obtained, a pairing does not need to occur prior to creating the socket.

In various embodiments, IDS framework 1115 can receive a particular port/service at the other device from client application 1105, determine the port/service based on information obtained from ID infrastructure 105, or determine the port/service from a token sent in the request. IDS framework 1115 can then communicate a device ID and other header information to message controller 1118 and/or UTUN controller 1120. IDS framework 1115 and UTUN controller 1120 can communicate via cross process communication (XPC). UTUN controller 1120 can be part of an IDS daemon, and can receive a device ID from ID infrastructure 105.

As mentioned above, UTUN controller 1120 can create a virtual address that corresponds to the actual device address, where the virtual address can be used to create a virtual socket. A virtual socket can also be created using any device ID (e.g., an actual address of a device or other ID). As an example, a socket can be created for communication between client application 1105 and kernel 1110 (e.g., in a streaming context), where kernel 1110 can have various sockets open with various client applications. Kernel 1110 can have a single connection to UTUN controller 1120 for the other device and multiplex (mux) the data from various client applications into the single connection. Instead or in addition, UTUN controller 1120 can also perform the muxing, e.g., if multiple socket exist between kernel 1110 and UTUN controller 1120 for various client applications to the other device. Incoming data can be demultiplexed (de-muxed) for sending to the destination client application.

As another example, a socket can be created between kernel 1110 and message controller 1118 (e.g., in a messaging context), where a socket can be created for each destination device, with different sockets to a same device potentially having different priorities. Thus, a particular virtual socket can be associated with a particular device and a particular priority (e.g., high and low). Message controller 1118 can have various connections to various client applications. Thus, message controller 1118 can provide mux/demux capabilities.

UTUN controller can create a primary socket with the other device. When UTUN controller 1120 receives data using a virtual connection associated with the second device, it can then map the virtual connection to the primary socket for communicating with the other device. All data for the other device can then be sent out through the primary socket. The virtual address for a virtual socket can be passed back to client application 1115, e.g., in the stream context. In one embodiment, a virtual socket involving kernel 1110 is a TCP socket. The virtual address can have a same format as a regular address, e.g., an IPv6 address. A mux module can include any combination of kernel 1110, message controller 1118, and UTUN controller 1120.

When client application sends data, client application 1105 can use the virtual socket to send data to kernel 1110. For example, the data can be sent using TCP via the virtual socket. Kernel 1110 can implement an UTUN interface for communicating with UTUN controller 1120. Kernel 1110 would pass the data (e.g., with a TCP header) and the virtual socket identifying the virtual address to UTUN controller 1120, which would then use the virtual address to resolve the device address for determining the device socket.

When sending to the data over the device socket, a link manager 1125 can determine which link to use. A link can be a particular combination of a wireless interface protocol (e.g., Bluetooth or Wi-Fi), a transport protocol (e.g., TCP, UDP, etc.), and a destination device. In this manner, UTUN controller 1120 does not need to know how the data is being sent, but instead can simply send the data to link manager 1125.

In various embodiments, the determination by link manager 1125 can be made per data packet, per set of data packets, per device socket, and may change from one data packet to another. Link manager 1125 may then select a link for sending the data. In the example shown, a Wi-Fi link 1130 provides software drivers for communicating with one or more Wi-Fi protocols, and BLTE link 1135 provides software drivers for communicating with Blutooth LE. Wi-Fi link 1130 is in communication with Wi-Fi hardware 1160, and BLTE link 1135 is in communication with BTLE hardware 1155. Wi-Fi link 1130 can be used for various Wi-Fi protocols, such as infra-Wi-Fi (infrastructure Wi-Fi). In one embodiment, link manager 1125 can try all links to determine whether any of the links can contact the other device, and then use a connected link with a highest predetermined rank or dynamic rank.

Hardware 1150-1160 can be in communication with links assigned to various devices. For example, links 1130, 1135, and 1140 can be assigned for communication with a second device. And, other links that are assigned for communication with a third device can also be in communication with hardware 1150-1160. When a particular hardware receives data, software can identify a particular sending device and then determine the corresponding link, e.g., using header information to determine the link corresponding to the sending device and transport protocol.

In some embodiments, a combined link 1140 can include an interface 1144 for communicating with link manager 1124 and a selector 1148 that selects a particular protocol to use. The protocols can be the same or different than that available to link manager 1125. Selector 1148 can perform similar functions as link manager 1125 in that a particular link is selected. However, link manager 1125 and selector 1148 can use different criteria for determining which link to use. For example, link manager 1125 can determine to use combined link 1140, and selector 1148 can then determine that BTLE hardware 1155 is to be used. The hardware can be contained on a same or separate chips.

One or more protocols can be only available via combined link 1140, such as classic Bluetooth hardware 1150. Link manager 1125 and selector 1148 can use various criteria for determining which link to use, such as power usage of a link, speed of a link (e.g., real-time data rate), and signal strength of a link. A goal of the optimization for selecting a link can be to provide a minimal data rate at a lowest possible energy.

While various embodiments of devices, systems, and methods are described herein, it will be apparent that the structure and order of objects or aspects of a method may be performed or placed in different order while remaining within the scope of the described devices, systems, and methods for performing relay with a call.

What is claimed is:

1. A method of using a wearable device associated with a user account to initiate a call via a mobile device, the method comprising:
    establishing, by the wearable device, a communication connection with the mobile device, the communication connection configured to share data with the mobile device, the mobile device configured to act as host for the call and to relay an audio signal associated with the call to the wearable device, via a call connection, after the call is answered by a recipient of the call, wherein the mobile device is associated with the user account that is associated with the wearable device;
    receiving a recipient number for the recipient of the call;
    transmitting, by the wearable device, the recipient number to the mobile device via the communication connection; and
    at least in response to receiving, via the communication connection, information that identifies that the recipient answered the call:
        establishing the call connection for the call with the mobile device, the call connection configured to share the audio signal between the wearable device and the mobile device; and
        receiving, via relay through the call connection with the mobile device, the audio signal associated with the call.

2. The method of claim 1, wherein a request to initiate the call is transmitted through the communication connection.

3. The method of claim 1, wherein at least one of the communication connection or the call connection comprise a Bluetooth connection.

4. The method of claim 1, wherein the mobile device comprises a cellular interface.

5. The method of claim 1, wherein the wearable device is configured without a cellular interface.

6. The method of claim 1, wherein the recipient number is received via a touch screen of the wearable device.

7. The method of claim 1, further comprising receiving, by the wearable device, a selection of the mobile device.

8. The method of claim 1, wherein the communication connection comprises a first connection.

9. The method of claim 8, wherein the call connection comprises a second connection that is different from the first connection.

10. A wearable device associated with a user account that is configured to initiate a call via a mobile device, the wearable device comprising:
    a wireless interface;
    a display; and
    at least one processor coupled to the wireless interface and the display, the at least one processor configured to:
        establish, via the wireless interface, a communication connection with the mobile device, the mobile device configured to act as host for the call and to relay an audio signal associated with the call to the wearable device, via a call connection, after the call is answered by a recipient of the call, wherein the mobile device is associated with the user account that is associated with the wearable device;
        receive a recipient number for the recipient of the call;
        transmit, via the communication connection, the recipient number to the mobile device; and
        at least in response to receiving, via the communication connection, information that identifies that the recipient answered the call:
            establish the call connection for the call with the mobile device, the call connection configured to share the audio signal between the wearable device and the mobile device; and
            receive, via relay through the call connection with the mobile device, the audio signal associated with the call.

11. The wearable device of claim 10, wherein the processor is further configured to:
    provide, on the display, a call end interface;
    receive an input to end the call at the call end interface; and
    close the call connection in response to the input to end the call.

12. The wearable device of claim 11, wherein the call is configured to continue at the mobile device after the call connection with the wearable device is closed.

13. The wearable device of claim 10, wherein the processor is further configured to present call details on the display.

14. The wearable device of claim 13, wherein the call details comprise caller ID information.

15. The wearable device of claim 10, wherein the communication connection is configured to share data with the mobile device.

16. A non-transitory computer-readable storage medium having stored thereon computer-executable instructions that, when executed by a processor of a wearable device associated with a user account and configured to initiate a call via a mobile device, cause the processor to perform operations comprising:
    establishing a communication connection with the mobile device, the mobile device configured to act as host for the call and to relay an audio signal associated with the call to the wearable device, via a call connection, after the call is answered by a recipient of the call, wherein the mobile device is associated with the user account that is associated with the wearable device;
    receiving a recipient number for the recipient of the call;
    transmitting, via the communication connection, the recipient number to the mobile device; and
    at least in response to receiving, via the communication connection, information that identifies that the recipient answered the call:
        establishing the call connection for the call with the mobile device, the call connection configured to share the audio signal between the wearable device and the mobile device; and
        receiving, via relay through the call connection with the mobile device, the audio signal associated with the call.

17. The non-transitory computer-readable storage medium of claim 16, wherein the operations further comprise:
   receiving a call end instruction, from the mobile device, over the communication connection; and
   closing the call connection in response to the call end instruction.

18. The non-transitory computer-readable storage medium of claim 16, wherein the call connection comprises a peer-to-peer connection.

19. The non-transitory computer-readable storage medium of claim 16, wherein the communication connection comprises a short-range wireless connection.

20. The non-transitory computer-readable storage medium of claim 16, wherein the communication connection is configured to share data with the mobile device.

* * * * *